(12) United States Patent
Ajima et al.

(10) Patent No.: US 7,746,023 B2
(45) Date of Patent: Jun. 29, 2010

(54) POSITION DETECTING DEVICE AND SYNCHRONOUS MOTOR DRIVING DEVICE USING THE SAME

(75) Inventors: Toshiyuki Ajima, Tokai (JP); Hideki Miyazaki, Hitachi (JP); Masataka Sasaki, Hitachi (JP); Bunji Furuyama, Hitachi (JP); Tokihito Suwa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/610,397

(22) Filed: Nov. 2, 2009

(65) Prior Publication Data

US 2010/0045219 A1 Feb. 25, 2010

Related U.S. Application Data

(63) Continuation of application No. 11/636,593, filed on Dec. 11, 2006, now abandoned.

(30) Foreign Application Priority Data

Dec. 12, 2005 (JP) ............................. 2005-357695

(51) Int. Cl.
*H02P 1/46* (2006.01)
(52) U.S. Cl. .................. 318/700; 318/721; 318/799
(58) Field of Classification Search ................. 318/560, 318/568.22, 599, 638, 127, 400.01, 400.14, 318/400.35, 700, 721, 722, 727, 773, 799, 318/801, 807, 811, 823, 437
See application file for complete search history.

(56) References Cited

U.S. PATENT DOCUMENTS

| | | | |
|---|---|---|---|
| 5,239,490 A | 8/1993 | Masaki et al. | |
| 5,352,962 A | 10/1994 | Galburt | |
| 5,783,924 A | 7/1998 | Kahlman | |
| 5,850,130 A * | 12/1998 | Fujisaki et al. | ........... 318/400.2 |
| 6,049,182 A | 4/2000 | Nakatani et al. | |
| 6,448,725 B1 | 9/2002 | Cho et al. | |
| 6,498,451 B1 | 12/2002 | Boules et al. | |
| 6,597,141 B1 | 7/2003 | Wilson-Jones et al. | |
| 6,791,217 B2 | 9/2004 | Collier-Hallman et al. | |
| 6,826,499 B2 | 11/2004 | Colosky et al. | |
| 6,828,752 B2 * | 12/2004 | Nakatsugawa et al. | ...... 318/801 |
| 6,873,126 B2 | 3/2005 | Inao et al. | |
| 7,026,779 B2 | 4/2006 | Eba | |

(Continued)

FOREIGN PATENT DOCUMENTS

EP    1220439 A2    7/2002

(Continued)

*Primary Examiner*—Bentsu Ro
*Assistant Examiner*—Antony M Paul
(74) *Attorney, Agent, or Firm*—Crowell & Moring LLP

(57) ABSTRACT

A position detecting device which can increase accuracy in detecting the pole position of a motor used to perform quick acceleration and deceleration over the range from a zero speed to a high rotation speed, and a synchronous motor driving device using the position detecting device. A position detector detects basic-wave component signals in sensor signals and executes position calculation. A correcting unit calculates signal information representing at least one of a gain, an offset and a phase by a phase detector from the basic-wave component signals detected by an error calculator, and makes correction based on the calculated signal information such that a position detection error is zero.

14 Claims, 14 Drawing Sheets

U.S. PATENT DOCUMENTS

| | | |
|---|---|---|
| 7,075,267 B1 | 7/2006 | Cheng |
| 7,161,323 B2 * | 1/2007 | Ajima et al. ................ 318/629 |
| 2005/0248306 A1 | 11/2005 | Chen et al. |
| 2006/0097676 A1 | 5/2006 | Katahira |

FOREIGN PATENT DOCUMENTS

| | | |
|---|---|---|
| EP | 1345316 A1 | 9/2003 |
| JP | 9-149676 | 6/1997 |
| JP | 3315847 P | 6/2002 |
| JP | 3397013 P | 2/2003 |

* cited by examiner

POSITION DETECTING DEVICE AND SYNCHRONOUS MOTOR DRIVING DEVICE USING THE SAME

CROSS REFERENCE TO RELATED APPLICATION

This application is a continuing application of U.S. application Ser. No. 11/636,593, filed Dec. 11, 2006, which claims priority under 35 U.S.C. §119 to Japanese Patent Application No. 2005-357695, filed Dec. 12, 2005, the entire disclosure of which are herein expressly incorporated by reference.

BACKGROUND OF THE INVENTION

1. Field of the Invention

The present invention relates to a position detecting device for detecting a motor pole position and a synchronous motor driving device using the position detecting device. More particularly, the present invention relates to a position detecting device and a synchronous motor driving device using the same, which are suitably used to perform acceleration and deceleration over the range from a zero speed (stopped state) to a high rotation speed.

2. Description of the Related Art

As one of devices for driving a synchronous motor (hereinafter referred to simply as a "motor"), there is known a type of driving the motor by using a position detecting device which detects a rotor pole position. Here, the term "position detecting device" means a device, such as a resolver or an absolute rotary encoder, which can not only detect a motor rotational angle during rotation, but also determine an absolute position in the stopped state. In order to achieve driving of the motor with high efficiency, however, it is essential to detect the phase of a counter electromotive voltage (i.e., the pole position of a motor rotor) by the position detecting device with high accuracy. Several techniques adapted for that purpose are also known.

For example, Patent Document 1 (Japanese Patent No. 3315847) discloses a technique of employing a detection unit for executing position calculation using a linear zone of a sensor signal, and correcting sensitivity and an offset based on maximum and minimum values of the sensor signal.

Also, Patent Document 2 (Japanese Patent No. 3397013) discloses a technique of employing a deviation detecting unit which detects a voltage and a current supplied to an armature coil to estimate a rotor pole position, and which detects a position deviation from an error between the estimated rotor pole position and a detected rotor rotational position, and correcting the detected position deviation.

SUMMARY OF THE INVENTION

As disclosed in Japanese Patent No. 3315847, in the field of the synchronous motor, there is known a position detecting method using an inexpensive Hall device as a position sensor which can not only detect a motor rotational position during rotation, but also determine an absolute position in the stopped state. Further, the technique for making correction based on the maximum and minimum values of the sensor signal is proposed to eliminate the influence of temperature change of the Hall device itself.

However, when the position sensor is used in a vehicle driving motor which is exposed to an abrupt temperature change, it is required to set a voltage range of the sensor signal in consideration of such a temperature change as well. For that reason, detection resolution is deteriorated and the accuracy in position detection becomes eventually insufficient, thus leading to a problem that specifications required for the synchronous motor cannot be satisfied. Another problem is that, because a deviation of the mount position is not corrected, convenience in fabrication and maintenance is not satisfactory.

Also, in the technique disclosed in Japanese Patent No. 3397013, the position detected value is corrected by calculating (storing) a position error between the motor rotor (magnet position) and the position sensor based on a mechanical mount error, which is caused in motor assembly, through pole-position estimating calculation.

However, because the position error between the motor rotor (magnet position) and the position sensor is corrected by executing the pole-position estimating calculation based on the motor applied voltage, the motor current, and the motor constants, complicated pole-position estimating calculation is required. Another problem is that high accuracy of the position sensor cannot be achieved because calculation errors caused by variations in the motor constants due to mass-production and variations in accuracy of current detection impose a limitation in correction of the position detected value.

An object of the present invention is to provide a position detecting device which can increase accuracy in detecting the pole position of a motor used to perform quick acceleration and deceleration over the range from a zero speed to a high rotation speed, and a synchronous motor driving device using the position detecting device.

(1) To achieve the above object, the present invention provides a position detecting device for detecting a motor pole position by using two or more sensor signals, the position detecting device comprising a position detector for detecting basic-wave component signals in the sensor signals and executing position calculation; and a correcting unit for calculating signal information representing at least one of a gain, an offset and a phase from the detected basic-wave component signals, and making correction based on the calculated signal information such that a position detection error is zero.

With those features, it is possible to increase the accuracy in detecting the pole position of a motor which is used to perform quick acceleration and deceleration over the range from a zero speed to a high rotation speed.

(2) In above (1), preferably, the position detector extracts the sensor signals in a range between predetermined first and second determination values, thereby detecting the basic-wave component signals.

(3) In above (1), preferably, the position detector extracts sensor signals representing middle potentials of the sensor signals, thereby detecting the basic-wave component signals.

(4) In above (1), preferably, the sensor signal has a distorted waveform including a predetermined zone in which a sensor signal value is hardly changed.

(5) In above (1), preferably, the sensor signals are three-phase signals of U-, V- and W-phases, and the position detector extracts a signal from a cross point between the U-phase signal and the W-phase signal to a cross point between the V-phase signal and the W-phase, a signal from a cross point between the V-phase signal and the W-phase signal to a cross point between the U-phase signal and the V-phase, and a signal from a cross point between the U-phase signal and the V-phase signal to a cross point between the U-phase signal and the W-phase, thereby detecting the basic-wave component signals.

(6) In above (1), preferably, the correcting unit comprises an error calculator for calculating a position error amount from a position calculated value obtained by the position detector; and a position corrector for correcting the position calculated value by using the position error amount calculated by the error calculator.

(7) In above (1), preferably, the correcting unit includes a signal corrector for determining an error amount of the sensor signal from a difference between the signal information and a predetermined reference value, and for correcting the sensor signal such that the determined error amount is zero.

(8) In above (1), preferably, the position detecting device further comprises a sensor unit for generating the sensor signal, and the sensor unit includes a magnetic adjusting member for adjusting an amount of effective magnetic flux crossing a sensor.

(9) In above (1), preferably, the position detecting device further comprises a sensor unit for generating the sensor signal, and the sensor unit includes a magnetic shielding member oriented perpendicularly to a direction in which a sensor senses magnetic flux.

(10) In above (1), preferably, the position detecting device further comprises a sensor unit for generating the sensor signal, and the sensor unit includes a plurality of sensors attachable to a motor housing from the outside.

(11) To achieve the above object, the present invention also provides a position detecting device for detecting a motor pole position by using two or more sensor signals, the position detecting device comprising a position detector for detecting basic-wave component signals in the sensor signals and executing position calculation; and a correcting unit for calculating signal information representing at least one of a gain, an offset and a phase from the detected basic-wave component signals, and making correction based on the calculated signal information such that a position detection error is zero, wherein the position detector extracts the sensor signals in a range between predetermined first and second determination values, thereby detecting the basic-wave component signals.

With those features, it is possible to increase the accuracy in detecting the pole position of a motor which is used to perform quick acceleration and deceleration over the range from a zero speed to a high rotation speed.

(12) To achieve the above object, the present invention further provides a permanent-magnet synchronous motor driving device comprising a position detecting device for detecting a motor pole position by using two or more sensor signals; and a motor controller for producing a PWM drive signal based on a position detected value detected by the position detecting device, and outputting the PWM drive signal to an inverter, thereby driving a permanent-magnet synchronous motor, wherein the position detecting device comprises a position detector for detecting basic-wave component signals in the sensor signals and executing position calculation; and a correcting unit for calculating signal information representing at least one of a gain, an offset and a phase from the detected basic-wave component signals, and making correction based on the calculated signal information such that a position detection error is zero.

With those features, it is possible to increase the accuracy in detecting the pole position of the motor which is used to perform quick acceleration and deceleration over the range from a zero speed to a high rotation speed.

(13) In above (12), preferably, the motor controller includes a rotor position settling unit for driving the permanent-magnet synchronous motor through a predetermined electrical angle in a stepping manner under PWM control and settling a rotor stop position of the motor when the signal information is calculated by the correcting unit, and the correcting unit of the position detecting device calculates, at a rotor position settled by the rotor position settling unit, a rotor position detection error from a difference between a value of the settled rotor position and the position detected value detected by the position detecting device, the rotor position detection error being corrected.

(14) In above (12), preferably, the motor controller receives a torque command, and the permanent-magnet synchronous motor has a motive power load over a wide speed range from a stopped state to a state of large acceleration and deceleration.

(15) In above (12), preferably, the motor controller receives a torque command from a vehicular control unit, and the permanent-magnet synchronous motor has a vehicular motive power load over a wide speed range from a stopped state to a high-speed travel state.

According to the present invention, higher accuracy can be obtained in detecting the pole position of the motor which is used to perform quick acceleration and deceleration over the range from a zero speed to a high rotation speed.

DESCRIPTION OF THE PREFERRED EMBODIMENTS

The construction of a synchronous motor driving device using a position detecting device according to a first embodiment of the present invention will be described below with reference to FIGS. 1-9.

Figure 1:
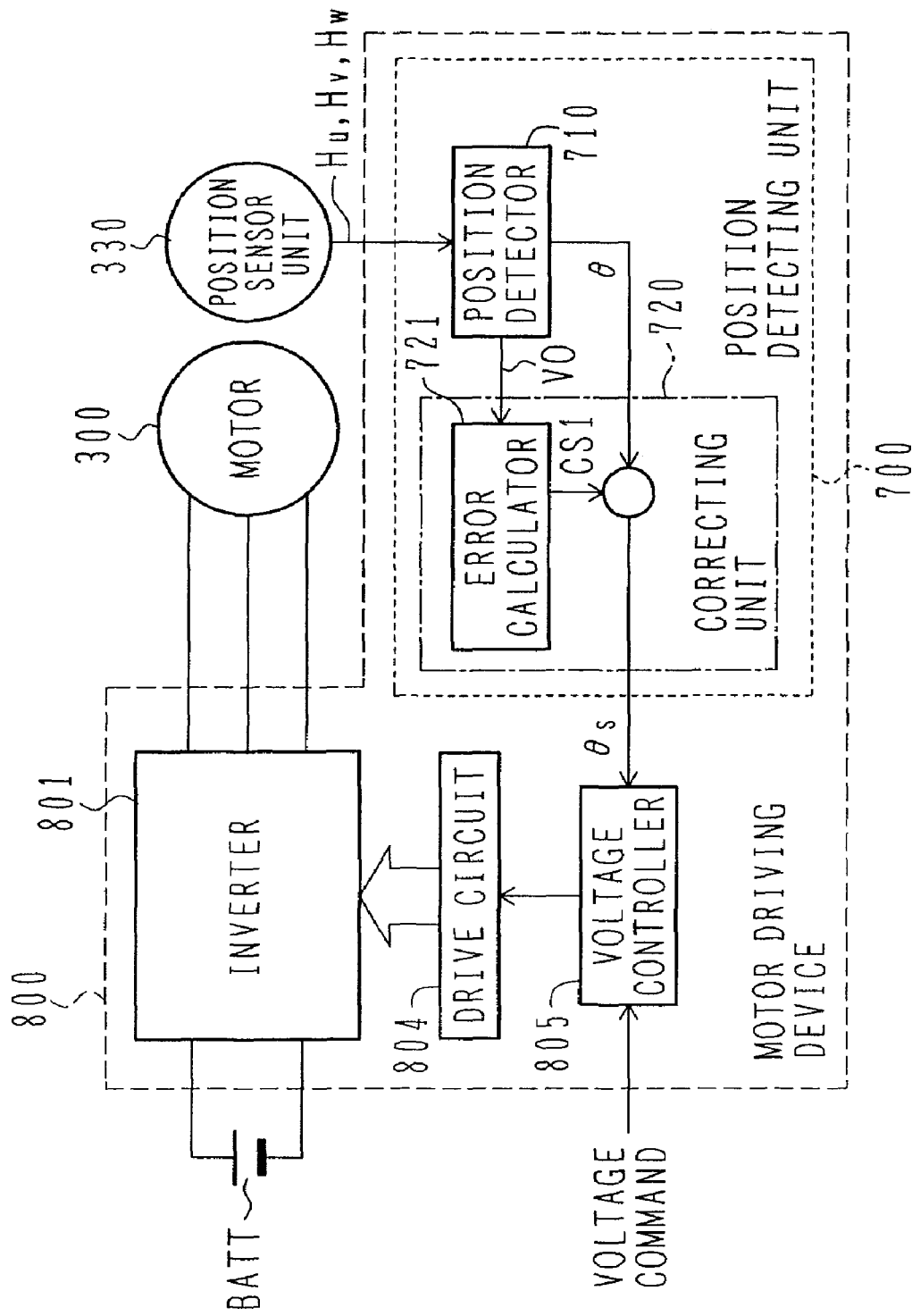
FIG. 1 is a block diagram of a synchronous motor driving device using a position detecting device according to a first embodiment of the present invention.

A description is first made of the construction of the synchronous motor driving device using the position detecting device according to this first embodiment with reference to FIG. 1.

FIG. 1 is a block diagram of the synchronous motor driving device using the position detecting device according to the first embodiment of the present invention.

A battery BATT serves as a DC voltage source for an inverter 801 in a motor driving device 800. A DC voltage is converted by the inverter 801 to a three-phase AC current with a variable voltage and a variable frequency, and the three-phase AC current is applied to a synchronous motor 300. A position sensor unit 330 is mounted to the synchronous motor 300 for controlling the phase of an applied three-phase AC voltage and the phase of an induced voltage of the synchronous motor to any desired phases. In order to control the voltage applied to the synchronous motor 300, the DC voltage is detected by a DC voltage sensor (not shown) and is used in a voltage controller 805.

By using a position detected value θs from a position detecting device 700 and a detected value of the DC voltage, the voltage controller 805 produces a drive signal, which is subjected to pulse width modulation (PWM) in a well-known manner, in match with a voltage command (for example, three-phase voltage commands in the case of AC control or d- and q-axis voltage commands in the case of vector control). The produced drive signal controls turning-on/off of a semiconductor switching device (not shown) of the inverter 801 through a driver, i.e., a drive circuit 804. Herein, the position detected value θs represents rotor position information and is obtained by calculating a position θ in a position detector 710 from sensor signals (Hu, Hv, Hw) and correcting a position error contained in the calculated position θ by a correcting unit 720. A correction amount CS1 is determined by an error calculator 721. The detailed operation of the position detecting device 700 will be described later with reference to FIGS. 5-9.

When the motor driving device 800 controls a motor rotation speed, it calculates the motor rotation speed based on the position detected value θs supplied from the position detecting device 700 and produces a voltage command such that the calculated motor rotation speed is matched with a speed command from a higher-level controller. Also, when the motor driving device 800 controls motor output torque, it detects a motor current, calculates the motor output torque based on the detected motor current, and produces a voltage command such that the calculated motor output torque is matched with a torque command from the higher-level controller.

The structure of the synchronous motor and a position sensor (rotation sensor of the position sensor unit) for use with the position detecting device according to this first embodiment will be described below with reference to FIGS. 2-4.

Figure 2:
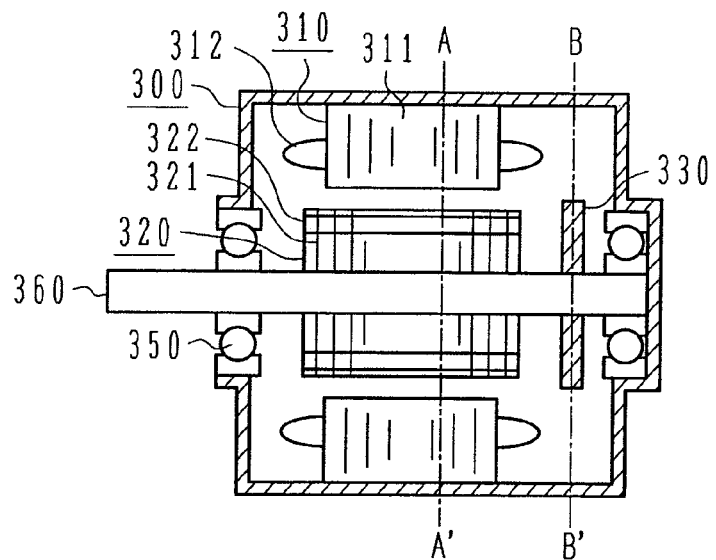
FIG. 2 is a sectional view showing the structure of a synchronous motor and a position sensor for use with the position detecting device according to the first embodiment of the present invention, the view being taken along the axial direction of the motor.
Figure 3:
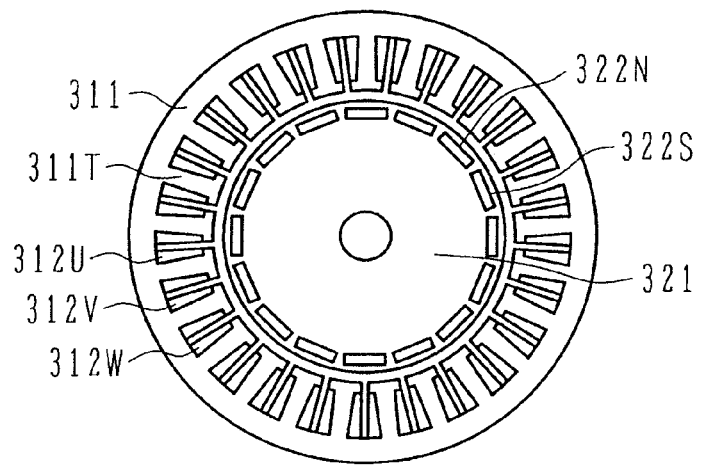
FIG. 3 is a sectional view taken along the line A-A' in FIG. 2.
Figure 4:
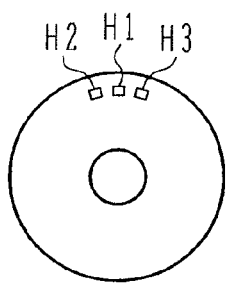
FIG. 4 is a sectional view taken along the line B-B' in FIG. 2.

FIGS. 2-4 show the structure of the synchronous motor and the position sensor for use with the position detecting device according to the first embodiment of the present invention. More specifically, FIG. 2 is a sectional view showing the structure of the synchronous motor and the position sensor for use with the position detecting device according to the first embodiment of the present invention, the view being taken along the axial direction of the motor. FIG. 3 is a sectional view taken along the radial direction of the motor, specifically taken along the line A-A' in FIG. 2, and FIG. 4 is a sectional view taken along the radial direction of the motor, specifically taken along the line B-B' in FIG. 2.

The motor shown in FIGS. 3 and 4 is a permanent-magnet synchronous motor in which a permanent magnet is used to generate a magnetic field, more specifically a permanent-magnet synchronous motor of the magnet embedded type that a permanent magnet is embedded in a rotor core 321. Further, the motor is an inner-rotor type motor in which a rotor (motor rotor) 320 is arranged inside the stator core 311 with a gap left between them, and it is a concentrated-winding motor in which a winding 312 is wound over each single tooth 311T of a stator core. The rotor 320 comprises the rotor core 321, a permanent magnet 322, and a motor shaft 360. The motor shaft 360 constituting the rotor 320 is rotatably supported by a bearing 350, and the position sensor unit 330 including rotation sensors is fixed to a motor housing. A stator 310 is also fixed to the motor housing by press-fitting or by using a key way. The winding 312 of the stator 310 is constituted by three-phase windings 312U, 312V and 312W of U, V and W phases which are arranged in sequence. The permanent magnet 322 of the rotor 320 is constituted by permanent magnets 322N each having an N polarity on the side facing the gap and permanent magnets 322S each having an S polarity on the side facing the gap, those permanent magnets 322N and 322S being alternately arranged in the circumferential direction.

The permanent magnet 322 is preferably made of a rare-earth magnet of Nd—Fe—B, for example, from the viewpoints of coercive force and cost, but it may also be made of another kind of rare-earth magnet or a ferrite magnet. In the latter case, only a motor output characteristic is changed. Also, the motor in this first embodiment is illustrated as constituting a 2-to-3 system which has 16 poles and 24 slots (i.e., a motor having poles and slots which are respectively integer times the pole number=2 and the slot number=3), but it may be constituted as any of other 4-to-3, 8-to-9 and 10-to-12 systems. Further, while this first embodiment is described in connection with the magnet-embedded and concentrated-winding motor, another surface-magnet or distributed-winding motor can also be used without problems.

As shown in FIG. 4, the position sensor unit 330 is made up of rotation sensors H1, H2 and H3 which are arranged at an angular interval of 120° in terms of motor electrical angle between the two sensors. The rotation sensors H1, H2 and H3 detect changes of magnetic flux from the same permanent magnet with rotation of the motor rotor in the sequence of the sensor H1→H2→H3 (or the reversed sequence when the direction of the rotation is reversed). While the rotation sensors H1, H2 and H3 are shown as being arranged at an angular interval of 120° in terms of electrical angle between the two sensors, they may be arranged at an angular interval of 120° in terms of mechanical angle between the two sensors. In the latter case, however, because the rotation sensors H1, H2 and H3 detect magnetic fluxes from different magnets and influences of errors caused in mounting (bonding) the permanent magnets appear, it is required to prepare memories in number corresponding to the number of the permanent magnets and to make correction through a learning process in a repeated manner.

The rotation sensors H1, H2 and H3 are usually packaged into one unit including sensor elements, an amplification circuit, a temperature correction circuit, etc. As an alternative, only the sensor elements may be disposed in the position sensor unit 330, whereas the amplification circuit, the temperature correction circuit, etc. may be disposed on a printed board constituting the motor driving device 800. Further, a plurality of rotation sensors may be packaged into one member and mounted in the position sensor unit 330. Conversely, the position detecting device 700 may be manufactured in the form of a dedicated IC, and the sensor elements and the position detecting device 700 may be both mounted in the position sensor unit 330. In the last-mentioned case, the number of outputs from the position sensor unit 330 can be reduced from three (Hu, Hv and Hw) to one (θs) by causing one output of the position detected value θs to be issued as analog output or a digital output after being subjected to the pulse width modulation.

The operation of the position detecting device 700 according to this first embodiment will be described below with reference to FIGS. 5-7.

Figure 5:
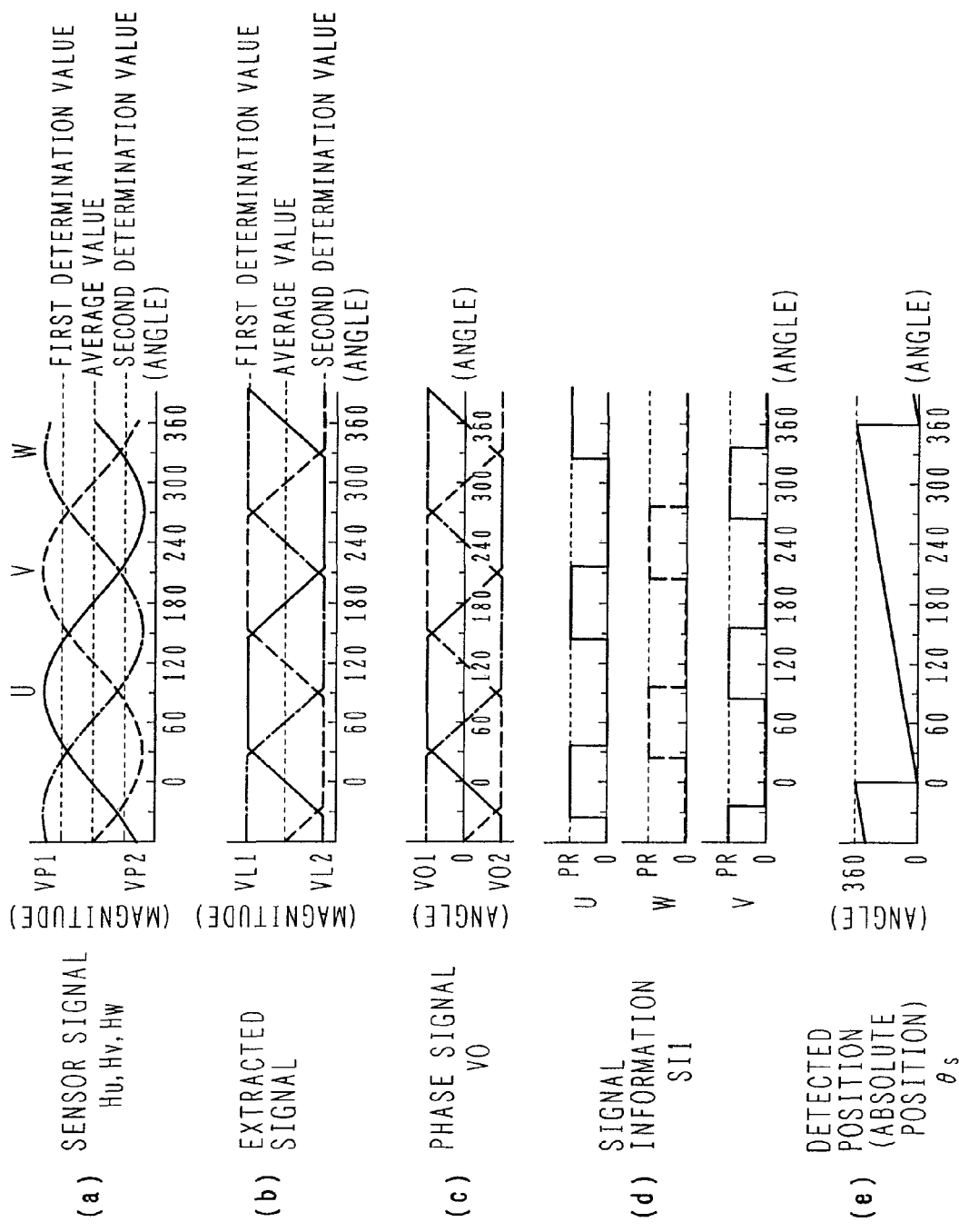
FIG. 5 shows waveform charts of operation signals for explaining the operation of the position detecting device according to the first embodiment of the present invention.
Figure 6:
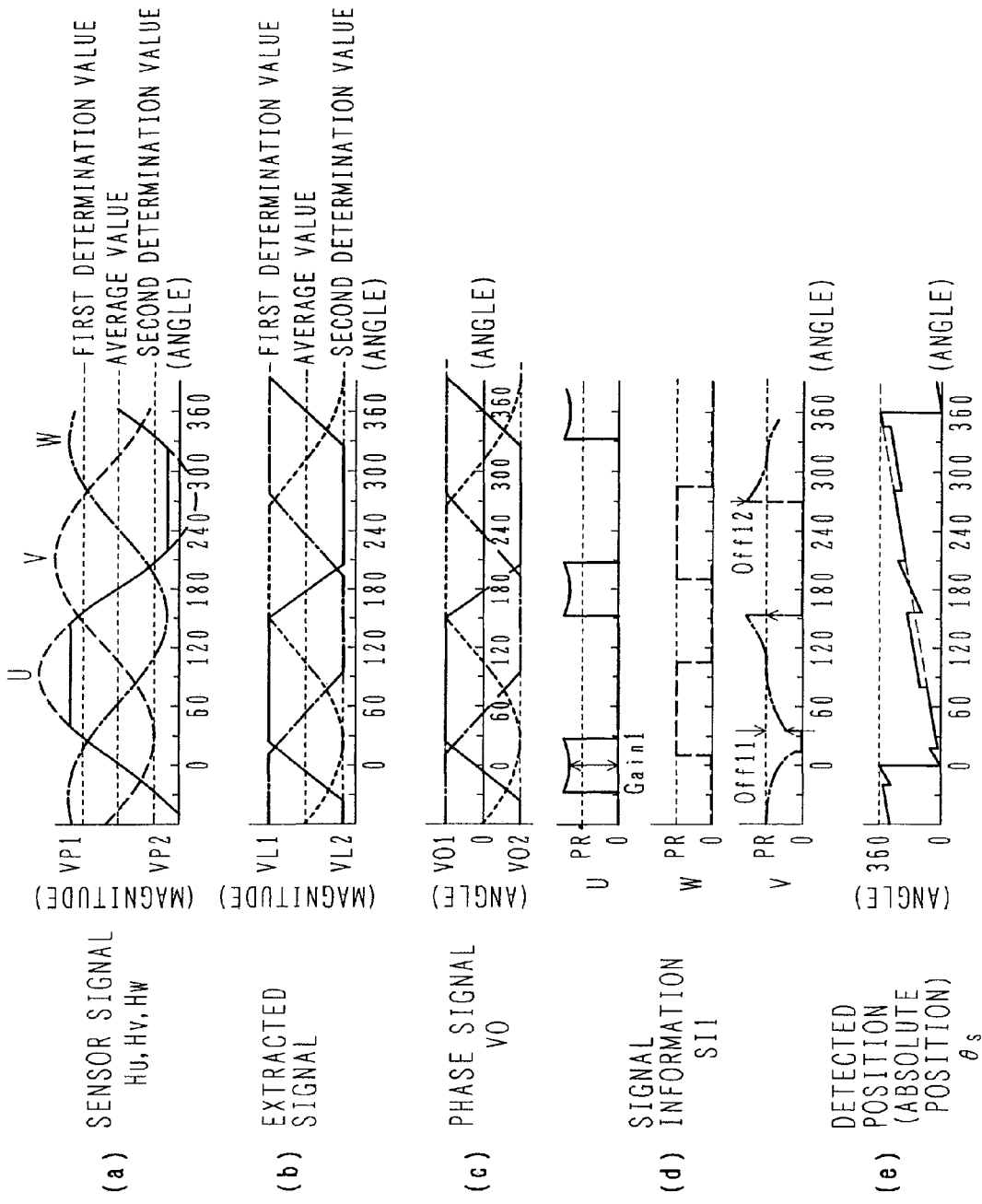
FIG. 6 shows waveform charts of the operation signals for explaining the operation of the position detecting device according to the first embodiment of the present invention.
Figure 7:
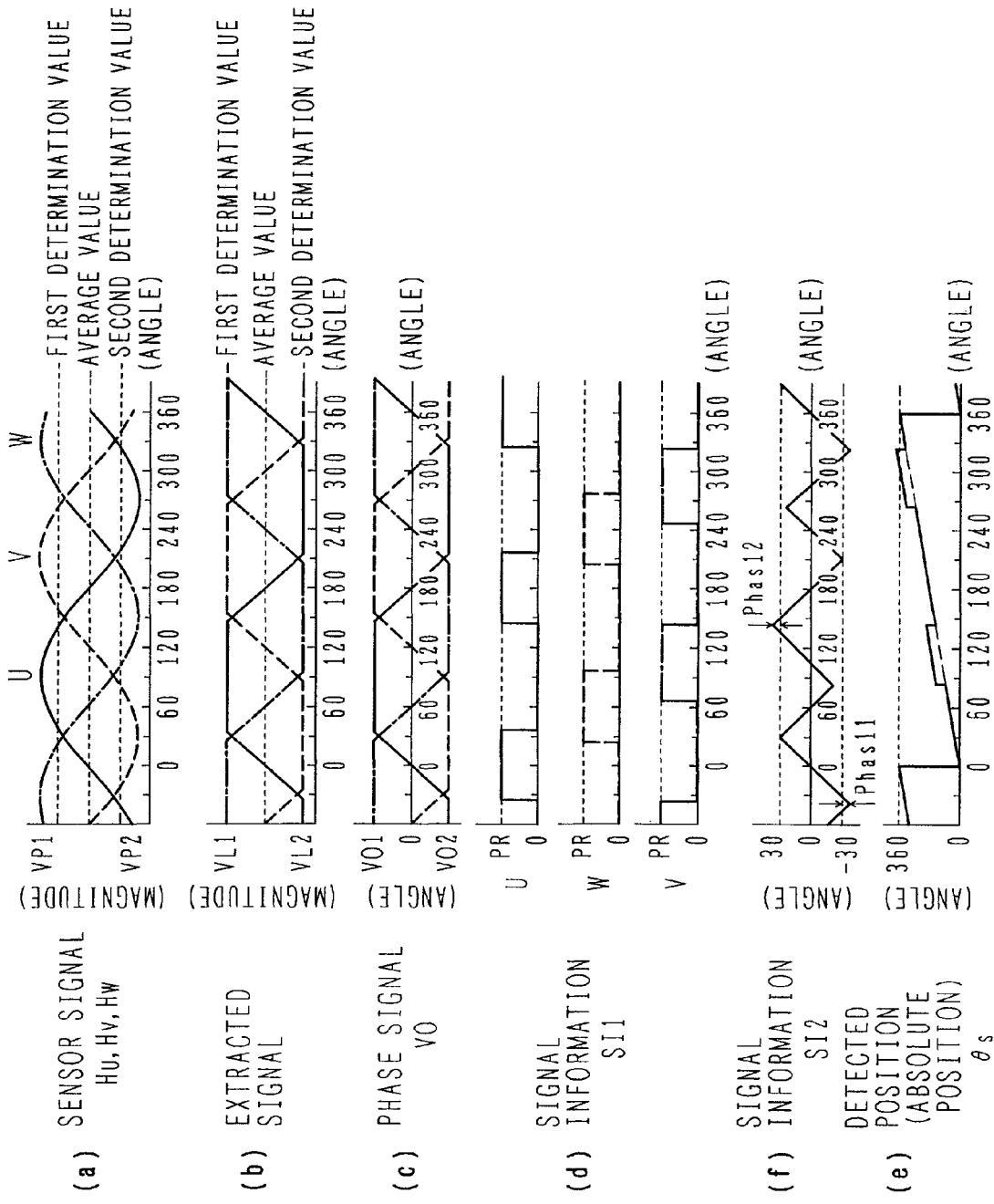
FIG. 7 shows waveform charts of the operation signals for explaining the operation of the position detecting device according to the first embodiment of the present invention.

FIGS. 5-7 show waveform charts of operation signals for explaining the operation of the position detecting device according to the first embodiment of the present invention. FIG. 5 shows examples of the operation signals in an ideal state, FIG. 6 shows examples of the operation signals including a gain error and an offset error, and FIG. 7 shows examples of the operation signals including a phase error.

First, the operation signals being in the ideal state and containing no errors are described below with reference to FIG. 5. The vertical axis in (a) of FIG. 5 represents a sensor signal, i.e., an output signal of the position sensor unit 330. The vertical axis in (b) of FIG. 5 represents an extracted signal extracted by the position detector 710. The vertical axis in (c) of FIG. 5 represents a phase signal VO obtained by the position detector 710. The vertical axis in (d) of FIG. 5 represents signal information SI1 obtained by the correcting unit 720. The vertical axis in (e) of FIG. 5 represents an angle signal indicating the detected position (absolute position) θs, which is outputted from the position detecting device 700. The horizontal axis in (a) to (e) of FIG. 5 represents an angle, namely an ideal phase (angle).

Further, in (a) to (d) of FIG. 5, a solid line represents a U-phase signal, a dotted line represents a V-phase signal, and a one-dot chain line represents a W-phase signal.

In the position detecting device 700, the position detector 710 receives, as input signals, the sensor signals Hu, Hv and Hw from the position sensor unit 330 and calculates the position θ based on the detected input sensor signals (also called the detected sensor signals), and the correcting unit 720 calculates the error correction amount CS1 and executes feed-forward correction for correcting the position detected value θs that indicates the rotational angle of the synchronous motor 300.

As shown in FIG. 4, three Hall devices are mounted to the position sensor unit 330 at the angular interval of 120° in terms of electrical angle. Therefore, the position sensor unit 330 outputs the sensor signals Hu, Hv and Hw corresponding to the U-, V- and W-phases shifted from each other by 120° in terms of electrical angle as shown at (a) in FIG. 5, which are inputted to the position detector 710.

The position detector 710 has a maximum value VP1 and a minimum value VP2 in its input range. The maximum value VP1 and the minimum value VP2 of the input range are values limited due to an input range of a power supply voltage for an analog circuit or an input range of an A/D converter. For example, the signals inputted to the position detector 710 are signals (detected sensor signals) ranging from VP1≈5 V to VP2≈0 V. The position detector 710 compares the inputted sensor signals with a first determination value VL1 larger than an average value (central value) VP0 of the sensor signals and with a second determination value VL2 smaller than the average value, and extracts the sensor signals in the range between the first and second determination values VL1, VL2, thereby detecting the extracted signals shown at (b) in FIG. 5. The extracted signals are thus given as signals obtained by clamping the sensor signals Hu, Hv and Hw based on the first and second determination values VL1 and VL2. Stated another way, the average value shown at (a) or (b) in FIG. 5 represents a middle potential of the sensor signals, and signals near the middle potential are extracted as the extracted signals.

Herein, the first and second determination values VL1, VL2 are preferably set as follows:

$$VP1 \geq VL1 \geq (\text{½ of crest value of sensor signal}) + VP0$$

$$VP2 \leq VL2 \geq VP0 - (\text{½ of crest value of sensor signal})$$

Thus, they are values that can be set when a maximum correction amount of each sensor signal is designed.

The extracted signals are signals which are used in position calculation and constitute basic wave components of the sensor signals. In other words, each of the extracted signals has a waveform obtained by cutting the vicinity of a peak value of the sensor signal and can be utilized in the range of a signal level with high sensitivity (although sensitivity becomes non-linear depending on the extracted zone, no problems arise in position detection).

Further, higher harmonic components superimposed on the sensor signal near its peak can be removed. In particular, as described later with reference to FIG. 6, when the sensor signal exceeds the input range, the detected sensor signal is given as a signal having a trapezoidal waveform, which has been subjected to peak cutting based on the maximum and minimum values (VP1, VP2) of the input range and includes many higher harmonics. However, the position calculation logic used in this first embodiment is not affected by those higher harmonics. The peak-cut signal has a distorted waveform including a zone where the sensor signal value is not changed. Stated another way, even when the sensor signal has a distorted waveform resulting from the peak cutting (i.e., even when a function of tan-1 cannot be used to determine a phase), position detection and position correction can be performed.

In addition, the position detector 710 calculates, from signal values of the extracted signals, corresponding phases by using the inverse trigonometric function or by executing a table search, thereby obtaining signal position calculated values FS1. The signal position calculated values FS1 are each given as a phase signal VO (at (c) in FIG. 5) near ±30° while the phase (0, 60, 120, 180, 240 and 300 in terms of angle) of a cross point between each ideal sensor signal and the central value is used as a reference phase value. Phases VO1 and VO2 corresponding to the first and second determination values have the relationship of:

$$VO2 \leq VO \leq VO1$$

The phase signal VO can be given by selecting one of values near the cross point between the signals of different phases, or by using one of values including the cross point itself as well. The signals of the respective phases in the ideal state cross each other at points of ±30°. Thus, the position θ can be obtained as an absolute angle in the range of 0-360° by repeatedly summing the phase signal VO which has been detected with a reference phase value being a base.

The correcting unit 720 calculates the signal information SI1, shown at (d) in FIG. 5, from the phase signal VO obtained by the position detector 710. Further, the correcting unit 720 detects an error from the difference between the signal information SI1 and a reference value PR, to thereby correct the position θ. For example, the correcting unit 720 can obtain the signal information SI1, shown at (d) in FIG. 5, through the steps of differentiating the phase signal VO, dividing the differentiated value by an output frequency f' of the inverter, and taking an absolute value of the divided value. Assuming here that a basic wave component of the phase signal VO is $\sin(\omega t+\alpha)$ (α is each phase of three-phase signals), its differentiated value is given by $\omega \cdot \cos(\omega t+\alpha)$. Because $\omega=2\pi f$ is held and a frequency f of the electrical angle of the synchronous motor is substantially equal to the output frequency f' of the inverter, the reference value PR ($2\pi$ in this example) of a signal gradient is obtained by dividing ω by the output frequency f' of the inverter.

Stated another way, the signal information SI1 is signal information containing information of both gain and offset, and the position detected value θs after correction is obtained through the steps of executing correction calculation on the signal information SI1 to calculate the error correction amount CS1, and adding the error correction amount CS1 to the position θ. Note that since the signal waveforms shown in FIG. 5 represent ideal signals, the signal information SI1 is a constant value in match with $2\pi$ of the reference value PR in the range of effective position information. Therefore, gain=1 and offset=0 are detected and the error correction amount CS1 resulting from the correction calculation is zero.

Thus, a signal having been subjected to peak cutting and having a trapezoidal waveform is avoided from becoming the detected sensor signal used in the position calculation, and stable position calculation can be realized. Also, by setting the first and second determination values (VL1, VL2) to fall within the range of the maximum and minimum values (VP1, VP2) of the input range, the position detection can be performed while making a pass/fail check of the calculation for the position detection. For example, the position calculation is determined as being properly executed if the corresponding phase signal VO satisfies the relationship of:

VO2<VO and VO<VO1

It is therefore possible to check abnormality in the position detection and to prevent runaway of the motor.

The operation signals in the state where the sensor signals include a gain error and an offset error will be described below with reference to FIG. 6. The vertical axes in (a) to (e) of FIG. 6 represent the same items as those in (a) to (e) of FIG. 5. The horizontal axis represents an angle, namely an ideal phase (angle), as in FIG. 5.

FIG. 6 shows, as seen from (a) of FIG. 6, an example in which a gain of the U-phase sensor signal Hu is increased and an offset (+) is caused in the V-phase sensor signal Hv. The W-phase sensor signal Hw is identical to that having the ideal values. A zone of the U-phase sensor signal Hu exceeding the maximum and minimum values (VP1, VP2) of the input range is indicated by a dotted line, and the detected sensor signal is indicated by a solid line after being clamped based on the maximum and minimum values (VP1, VP2).

Because the position calculation is executed using the levels (determination values) VL1, VL2 of the extracted signals, influences of the gain error and the offset error also appear in the phase signal VO as shown at (c) in FIG. 6.

Accordingly, as shown at (d) in FIG. 6, the influences of both the errors are detected in the U and V phases of the signal information SI1 obtained through the signal position calculation. The detected position is shown such that a solid line represents the detected value not yet subjected to the error correction, and a broken line represents the ideal detected value. Further, the gain error appears such that, in two detection zones located within 0-360°, error amounts (i.e., amounts of position error with respect to the ideal detected value) at the start and the end of each zone take positive and negative values. The offset error appears such that error amounts (i.e., amounts of position error with respect to the ideal detected value) in two detection zones located within 0-360° take positive and negative values. Thus, by detecting those error amounts, the gain error and the offset error can be corrected.

A practical detection method will be described below. A gain error Gain1 detected on the U-phase signal is detected as a gain error coefficient Ge and is expressed by:

(gain error coefficient Ge)=(signal information SI1)/ (reference value PR)

However, the gain error coefficient Ge has an effective value only in a zone of effective position information (U-phase signal information SI1≠0). Also, the timing of detecting the gain error is preferably near a central value of the sensor signal. In one example, that timing corresponds to the timing at which the change of the U-phase signal information SI1≠0 is obtained. In another example, that timing corresponds to the timing of zero-crossing that is obtained by differentiating the extracted signal twice.

On the other hand, an offset error Off1 detected on the V-phase signal is detected as an offset error coefficient Oe given by the difference between two detection points (Off11, Off12) as follows:

(offset error coefficient Oe)=Off11−Off12

However, the offset error coefficient Oe has an effective value only in a zone of effective position information (V-phase signal information SI1≠0). Also, the timing of detecting the offset error is preferably a point in time near each of the start and the end of the effective position information. In one example, that timing corresponds to the timing at which the V-phase signal information SI1≠0 is obtained. In another example, that timing corresponds to the timing at which the extracted signal takes a value almost equal to each of the first and second determination values (VL1, VL2).

The correcting unit 720 calculates a phase to be corrected by using the gain error coefficient Ge and the offset error coefficient Oe, and corrects the error correction amount CS1 with respect to the position θ (i.e., the detected value not yet subjected to the error correction (indicated by the solid line)), thereby obtaining the position detected value θs that is made asymptotic to the ideal detected value (indicated by the broken line).

Alternatively, the gain error and the offset error may be detected as follows. Assuming the detected sensor signal including errors to be expressed by $A \cdot \sin(\omega t+\alpha)+D$, $2\pi A \cdot \cos(\omega t+\alpha)$ is obtained, as described above, by differentiating it and dividing the differentiated value by the output frequency f' of the inverter. Therefore, $2\pi A$ is obtained by measuring a maximum value of the latter signal, and an offset D is obtained from the detected sensor signal at the timing of (ωt+α=0) at which the maximum value is obtained (the timing at which the maximum value is obtained may be a zero-crossing point resulting from differentiating the detected sensor signal twice, which corresponds to the zone of the extracted signal). Thus, the gain error can be determined as A (i.e., a ratio of 2πA to the reference value 2π), and the offset error can be determined as D.

The operation signals in the state where the sensor signal includes a phase error will be described below with reference to FIG. 7. The vertical axes in (a) to (e) of FIG. 7 represent the same items as those in (a) to (e) of FIG. 5. The vertical axis in (f) of FIG. 7 represents signal information SI2 obtained by the correcting unit 720. The horizontal axis represents an angle, namely an ideal phase (angle), as in FIG. 5.

FIG. 7 shows, as seen from (a) of FIG. 7, an example in which the phase of only the V-phase sensor signal Hv is advanced. The U- and W-phase sensor signals Hu, Hw are identical to those having the ideal values.

Because the position calculation is executed using the levels (determination values) VL1, VL2 of the extracted signals, an influence of the phase error also appear in the phase signal VO (i.e., a state where the V phase is advanced), as shown at (c) in FIG. 7. The levels of the V-phase extracted signal are substantially equal to the ideal values and therefore an error is not caused in the position calculation. Hence the influence of the phase error does not appear in the signal information SI1 obtained through the signal position calculation.

A phase shift in the V phase appears as a phase error relative to each reference phase value (120°, 300°) in the V phase, and the position θ is given by the detected value (indicated by the solid line) not yet subjected to the error correction. The phase error differs from the offset error in that error amounts (i.e., amounts of position error relative to the ideal detected value) in two detection zones located within 0-360° appear excessive or deficient in the same direction. Thus, by detecting those error amounts, the phase error can be corrected.

A practical correction method will be described below. The correcting unit 720 detects a phase shift by using the signal information SI2 shown at (f) in FIG. 7. The signal information SI2 is produced from the signal obtained through the signal position calculation (or obtained from the extracted signal as an alternative) and has a signal waveform produced from values at cross-points between the respective signals or middle values of the respective signals. Incidentally, the ideal signals used in the signal position calculation cross each other at points of ±30°.

To detect the phase shift, the U-phase signal is used as a reference phase. More specifically, an amount of phase shift of the V-phase signal relative to the U-phase signal (hereinafter referred to simply as a "V-phase signal phase error UV"), and an amount of phase shift of the W-phase signal relative to the U-phase signal (hereinafter referred to simply as a "W-phase signal phase error UW") are determined. In (f) of FIG. 7, ideal phase differences at cross points between the U- and V-phase signals (two points within 0°-360°) are assumed to be Phas11 and Phas12. The V-phase signal phase error UV appears in the case of Phas11≠Phas12 and is detected by taking one of those two values or an average value thereof as an error amount. The detected error amount is used as the error correction amount CS1 in the phase detection zone for the V phase to correct the phase (position) θ (i.e., the detected value (indicated by the solid line) not yet subjected to the error correction), thereby obtaining the position detected value θs that is made asymptotic to the ideal detected value (indicated by the broken line).

As described above, the position detection can be performed even when the inputted sensor signal has a signal waveform in excess of the input range or it has a distorted waveform resulting from clamping made in match with the input range. Also, even when an error is superimposed on the sensor signal, the position detected signal θs can be obtained with accuracy as high as when the ideal sensor signal is inputted, by correcting the superimposed error.

On the other hand, assuming the case where the U-phase signal as the reference signal also has a phase shift (hereinafter referred to simply as a "U-phase signal phase error UU"), the accuracy of the position detection in the range of 0°-360° can be increased by the above-described phase error correction, but an error of the absolute position (i.e., the phase shift of the U-phase signal) cannot be corrected by only the above-described phase error correction. Even when such an error of the absolute position remains, that error affects neither a ripple of the voltage applied to the motor nor a ripple of the motor current (equivalent to a torque ripple), and therefore the motor can be smoothly driven with high accuracy. However, that error appears as a drop of the motor efficiency when the motor is rotated at high speed. One preferable method for reducing the error of the absolute position comprises the steps of obtaining the U-phase signal phase error UU from the V-phase signal phase error UV, the W-phase signal phase error UW, and a phase difference VW between the V- and W-phase signals by calculation, and averaging those phase errors to reduce an overall amount of the phase error. Another preferable method comprises the steps of applying a predetermined voltage vector to drive the motor in a stepping way, and detecting the U-phase signal phase error UU.

The relationship between a voltage vector and the pole position (phase) of the rotor in the position detecting device 700 according to this first embodiment will be described below with reference to FIG. 8.

Figure 8:
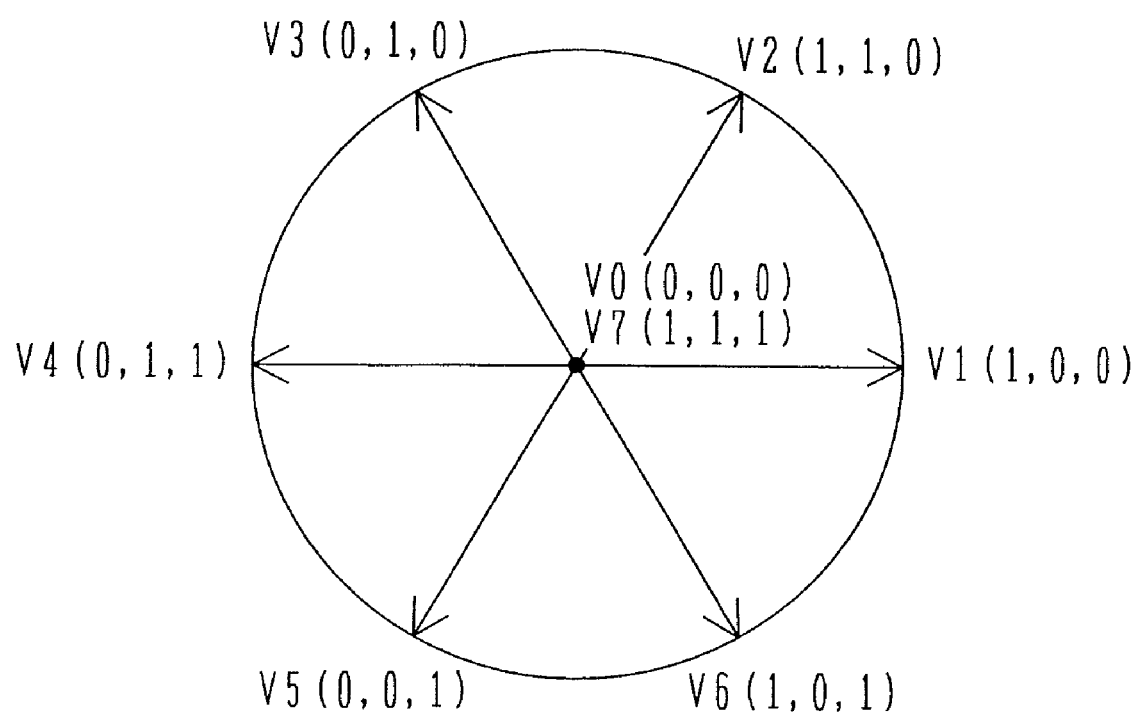
FIG. 8 is a graph for explaining the relationship between a voltage vector and the pole position (phase) of a rotor in the position detecting device according to the first embodiment of the present invention.

FIG. 8 is a graph for explaining the relationship between a voltage vector and the pole position (phase) of the rotor in the position detecting device according to the first embodiment of the present invention.

The sensor signals from the position sensor unit 330 are mathematically expressed by the following formulae (1), (2) and (3):

$$HU(n)=A1\cdot\sin(\theta a(n)+\alpha)+C1 \quad (1)$$

$$HV(n)=A2\cdot\sin(\theta a(n)-120+\beta)+C2 \quad (2)$$

$$HW(n)=A3\cdot\sin(\theta a(n)+120+\gamma)+C3 \quad (3)$$

While the sensor signals are mathematically expressed here as sine-wave signals for the sake of simplicity, the following discussion is similarly applied to trapezoidal-wave signals containing higher harmonics. In the formulae, a suffix (n) represents a value corresponding to arbitrary sampling, and θa represents the pole position (phase) of the rotor. Further, (A1, A2, A3), (C1, C2, C3) and (α, β, γ) represent respectively gains, offsets and phase errors of the sensor signals (HU, HV, HW). The gain error, the offset error, the V-phase signal phase error UV, and the W-phase signal phase error UW of the sensor signals are detected as described above. Accordingly, if the U-phase signal phase error UU (=α) is obtained, the absolute position can also be corrected by setting β=V-phase signal phase error UV-α) and γ=W-phase signal phase error UW-α.

On the other hand, in the three-phase inverter 801, because the output voltage takes 0 or 1 for each of the three phases, there are eight (=third power of 2) combinations in total. The pole position (phase) of the rotor is decided by voltage vectors expressed using those eight combinations of the output voltages. Generally, the pole position (phase) is not definitely decided by two voltage vectors which are called zero voltage vectors, i.e., a voltage vector V0 and a voltage vector V7. However, the pole position (phase) can be definitely decided by applying the remaining six voltage vectors for a time sufficient for the rotor to rotate. For example, in the case of a voltage vector V1 in which the U-phase voltage is 1 and the voltages in the other phases are 0, the relationship among respective currents (IU, IV, IW) in U, V and W phases is such that a current of IU=−(IV+IW) flows and the rotor is stopped in a predetermined electrical angle position (phase). That description is similarly applied to the other voltage vectors. Thus, the rotor can be held in an electrical angle position (phase) at intervals of 60° by applying the six voltage vectors in total.

In such a case, the phase error detection logic is required to be executed at the start or the end of the motor. However, since the phase error is attributable to a mounting error, the phase error detection logic is just required to be executed once when the sensor is mounted or replaced, by storing the detection result. In other words, the phase error detection logic is not always required to be executed at the ordinary start of the motor.

The electrical angle position (phase) representing the rotor pole position, which corresponds to the applied voltage vector, is compared with the phase of the sensor signal obtained by the position detecting device 700 and expressed by each of the formulae (1) to (3) (which may be any of the signal position calculated value FS1, the phase (position) θ, and the position detected value θs). The thus-detected error is employed as the phase shift (error amount) in the U phase to correct the phase errors in the V and W phases. Alternatively, the position detected value θs may be corrected. As a result, even when the phase shift is caused in the U-phase signal and the phase errors of the V- and W-phase signals are detected with the U-phase signal employed as the reference phase, the phase correction can be realized with high accuracy.

Preferably, a plurality of voltage vectors are applied so as to rotate the rotor forward and backward, and the electrical angle position (phase) θa of the rotor and the phase obtained by the position detecting device 700 are compared with each other successively plural times. Such a process enables the phase correction to be performed with higher accuracy even when load torque or friction torque is caused. Also, by adjusting the time of application of the voltage vector at intervals of 60° (through PWM (pulse width modulation)), it is also possible to detect the phase error even at an intermediate angle (phase) during the intervals of 60°.

The above description is made on assumption that the gains (A1, A2, A3) and the offsets (C1, C2, C3) of the sensor signals (HU, HV, HW) are known. However, by applying a plurality of voltage vectors and detecting the sensor signals (HU, HV, HW) at each electrical angle position (phase) θa of the rotor, the above-mentioned simultaneous equations (1), (2) and (3) can be solved to obtain the respective errors of the sensor signals. Such a method is effective, for example, in making pass/fail determination of a product in an offline mode (i.e., in a correction value detection mode separate from actual operation) during production of products, etc., or setting initial values in a shorter time.

The error detection and the correction operation executed in the position detecting device 700 according to this first embodiment will be described below with reference to FIG. 9.

Figure 9:
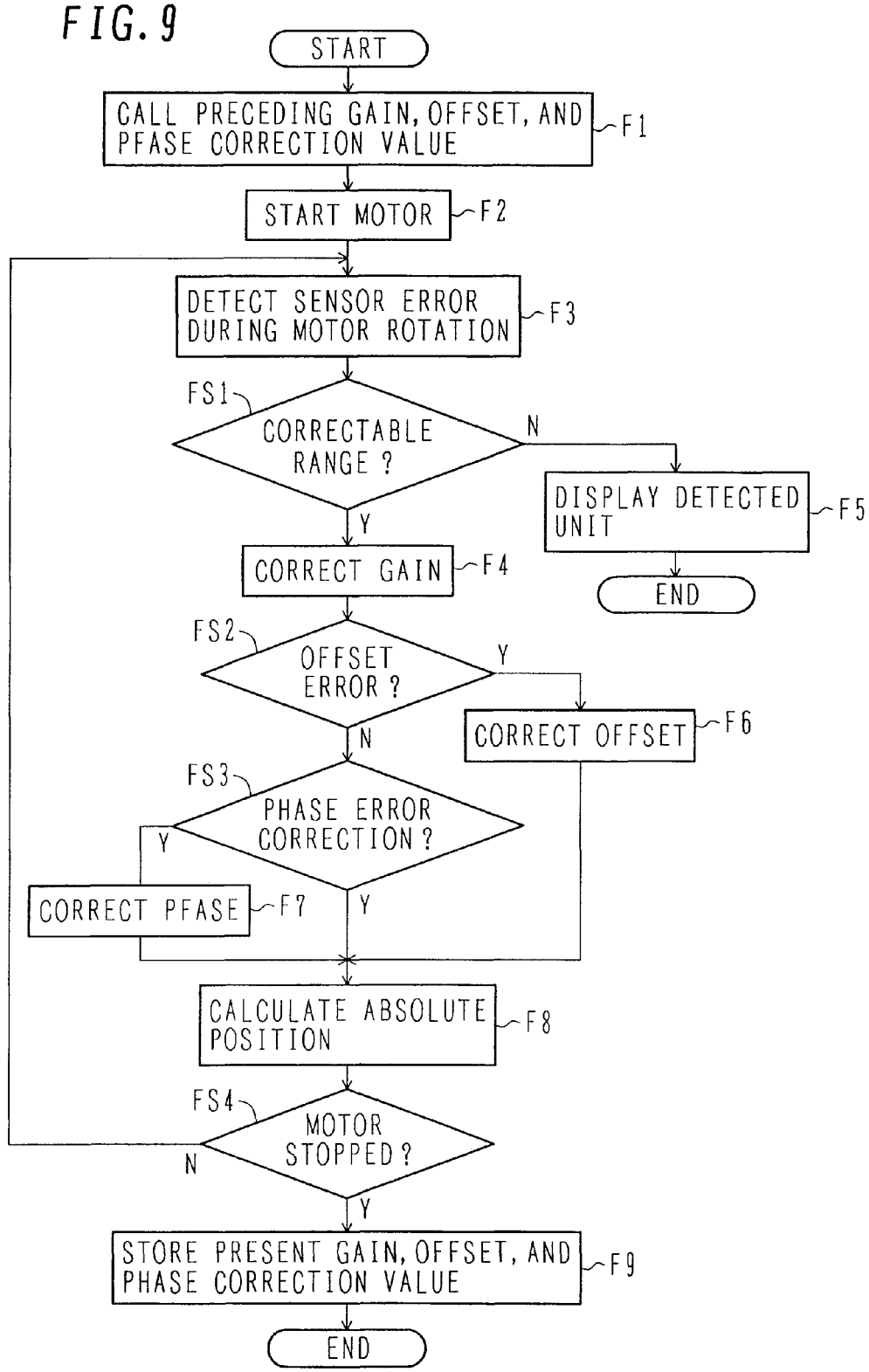
FIG. 9 is a flowchart showing error detection and correction operation executed in the position detecting device according to the first embodiment of the present invention.

FIG. 9 is a flowchart showing the error detection and the correction operation executed in the position detecting device according to the first embodiment of the present invention.

When source power is turned on, the position detecting device 700 first calls, in step F1, preceding gain, offset, and phase correction values from, e.g., a flash memory and sets them as correction initial values.

Then, in step F2, the voltage controller 805 starts to rotate the motor by using the position detected value θs from the position detecting device 700. Here, the position detected value θs is obtained by correcting the output 0 of the position detector 710 with correction initial values CS1 set in step F1.

In step F3, the error calculator 721 calculates the phase θ during the motor operation as described above and detects respective sensor errors.

In step FS1, the position detecting device 700 checks the magnitude and variation of each of the detected errors. If the detected error is larger than a predetermined allowable error range, the position detecting device 700 proceeds to step F5 in which the presence of a large detection error is informed (displayed) to a higher-level ECU (engine control unit) and a control panel, followed by bringing the control flow to an end. If the detected error is within the predetermined allowable error range, the position detecting device 700 proceeds to step F4 in which the gain error correction value is updated.

In step FS2, based on the magnitude of the offset error, the position detecting device 700 determines whether or not the offset error has the magnitude or it reaches the timing to update the correction value. If the update is to be performed, the position detecting device 700 updates the offset correction value in step F6. Otherwise, the position detecting device 700 determines in step FS3, based on the magnitude of the phase error, whether or not the phase error has the magnitude or it reaches the timing to update the correction value. If the update is to be performed, the position detecting device 700 updates the phase correction value in step F7.

In step F8, the error calculator 721 applies the correction amount CS1 to the phase θ, to thereby obtain the position detected value θs after the correction.

If it is determined in step FS4 that the motor is not to be stopped, the position detecting device 700 repeats the above-described control flow. If the motor is to be stopped, the position detecting device 700 stores, in step F9, final gain, offset, and phase correction values in, e.g., the flash memory. Because the temperature generally differs between the start and the stop of the motor operation, the correction values after the lapse of a certain time from the start of the operation subsequent to the power-on may be stored after a repeated learning process instead of storing the final gain and offset correction values. Since the phase correction value is a value to correct a mechanical mounting error and is not so changed, it can be stored as a correction value obtained through a repeated learning process or by taking a moving average. In addition, the phase correction value is preferably reset after maintenance work, for example, when the position sensor unit 330 is replaced.

Thus, even when the sensor suffers from change of the design temperature, deterioration, etc. after shipment of the product, sensor correction or failure detection can be performed online (during actual operation).

While the above description is made of the method of extracting the basic wave component from the detected sensor signal through the determination process, the position detection and the position correction can also be similarly performed by extracting the basic wave component through a frequency analysis, such as FFT, of the peak-cut sensor signal or the detected sensor signal. In that case, the position θ can be easily obtained, for example, by using a signal value resulting from inverse transform of only the basic wave, and the position correction can also be easily performed by using the amplitude, the offset and the phase which have been obtained by the waveform analysis.

According to this first embodiment, as described above, since the gain error, the offset error, and the phase error can be corrected on the sensor signals detected by the position sensor unit 330, the detection accuracy of the pole position can be increased. It is hence possible to increase the accuracy in detecting the pole position of the motor which is used to perform quick acceleration and deceleration over the range from a zero speed to a high rotation speed.

Further, by correcting the position error after the power-on, a deviation of the mount position can also be corrected, thus resulting in higher convenience in both fabrication and maintenance.

Moreover, the correction of the position error also makes it possible to correct a calculation error that is caused by a variation in motor constants attributable to mass production of motors and a variation in accuracy of current detection.

The construction of a synchronous motor driving device using a position detecting device according to a second embodiment of the present invention will be described below with reference to FIGS. 10 and 11. Note that the basic construction of the synchronous motor driving device using the position detecting device according to the second embodiment is the same as that shown in FIG. 1.

Figure 10:
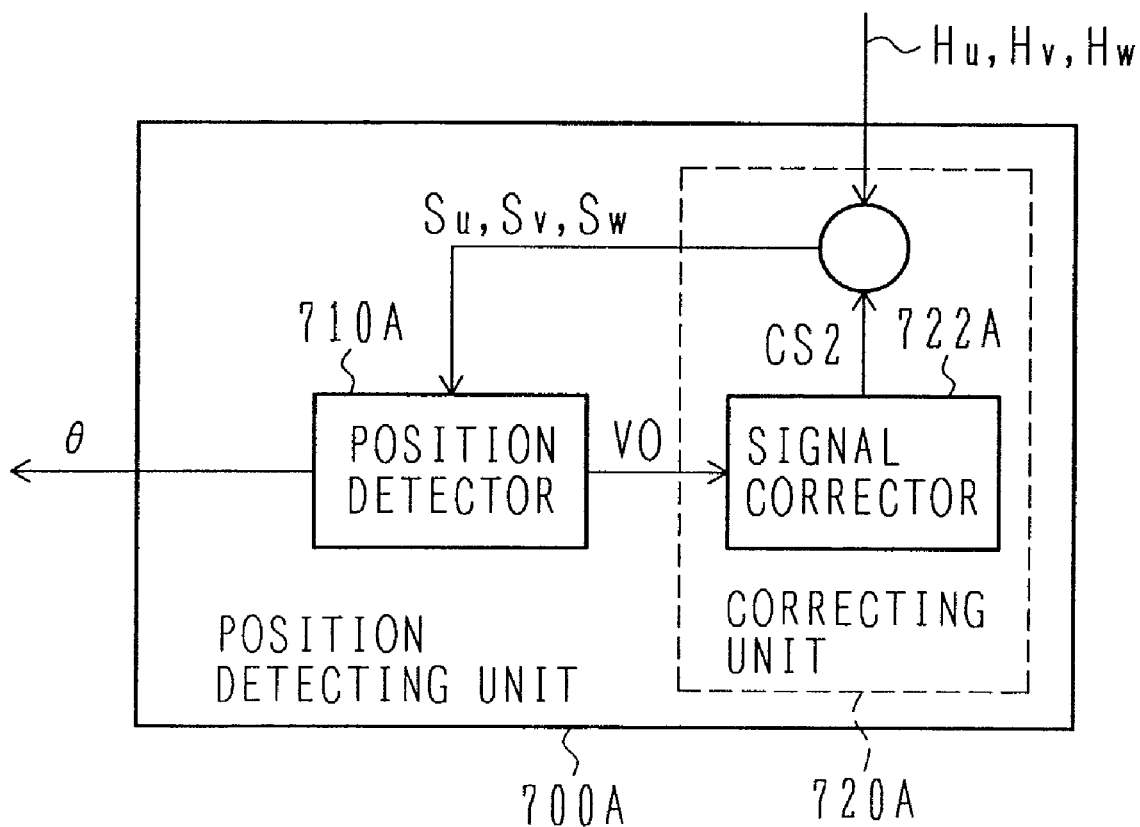
FIG. 10 is a block diagram of a position detecting device according to a second embodiment of the present invention.

FIG. 10 is a block diagram of the position detecting device according to the second embodiment of the present invention. FIG. 11 shows waveform charts of operation signals for explaining the operation of the position detecting device according to the second embodiment of the present invention.

Figure 11:
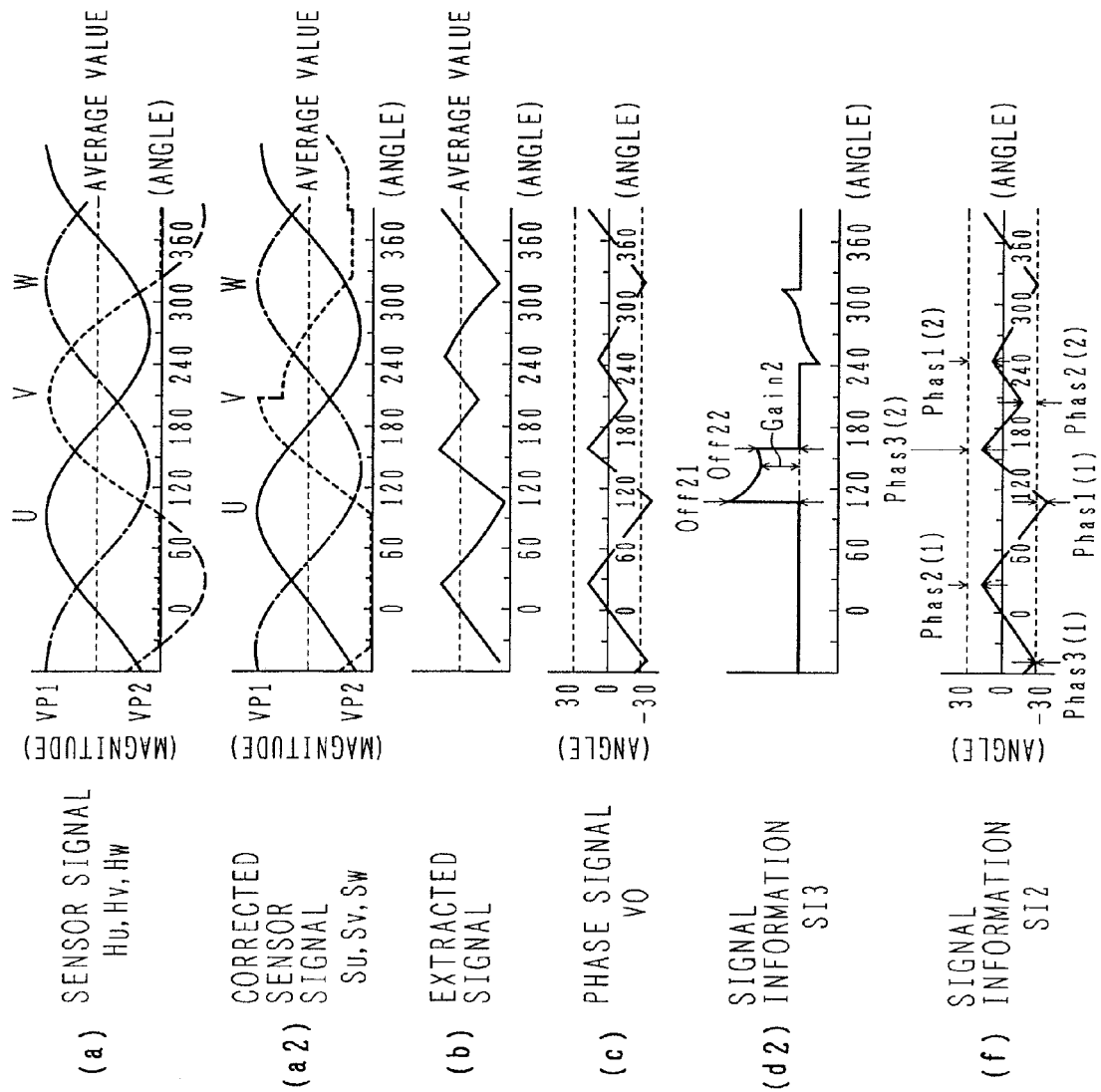
FIG. 11 shows waveform charts of operation signals for explaining the operation of the position detecting device according to the second embodiment of the present invention.

The vertical axes in (a), (b), (c) and (f) of FIG. 11 represent the same items as those in (a), (b), (c) and (f) of FIG. 7. The vertical axis in (a2) of FIG. 11 represents the sensor signal after correction, and the vertical axis in (d2) of FIG. 11 represents signal information SI3. The horizontal axis represents an angle, namely an ideal phase (angle), as in FIG. 5.

FIG. 10 differs from FIG. 1 in that a position detecting device 700A corrects the inputted sensor signals Hu, Hv and Hw in a correcting unit 720A by using a signal corrector 722A. Stated another way, while the signal error is corrected by feed forward control in the first embodiment of FIG. 1, the signal error is corrected by feedback control in this second embodiment.

Also, the extracted signal shown at (b) in FIG. 11 greatly differs from the extracted signal in FIG. 7 in that the former has a signal waveform produced from values at cross-points between the respective sensor signals after correction ((a2) in FIG. 11) or middle values of those signals. Operations indicated by other identical characters are the same as those in FIG. 7.

The sensor signals Hu, Hv and Hw inputted to the position detecting device 700A in FIG. 10 are given as the detected sensor signals (indicated by respective lines at (a) in FIG. 11 after clipping) and are corrected by the correcting unit 720A in accordance with a correction amount CS2 outputted from the signal corrector 722A, followed by being outputted as the corrected sensor signals Su, Sv and Sw after the correction. The position detector 710A calculates the phase from the corrected sensor signals Su, Sv and Sw and outputs the phase signal VO. The correcting unit 720A detects the gain error, the offset error, and the phase error, which are contained in the sensor signals, from the phase signal outputted from the position detector 710A, and outputs the correction amount CS2. The corrected sensor signals Su, Sv and Sw are obtained by executing signal calculation using the correction amount CS2.

In an example shown at (a) in FIG. 11, the V-phase sensor signal Hv contains the gain error and the offset error, and the W-phase sensor signal Hw contains the phase error. The U-phase sensor signal Hu takes the same value as the ideal one.

The corrected sensor signals Su, Sv and Sw having been subjected to the correction by the signal corrector 722A, shown at (a2) in FIG. 11, are signals resulting from executing the correction calculation on the detected sensor signals (i.e., the sensor signals having waveforms indicated by respective lines at (a) in FIG. 11 after clipping) at the timing of each cross point between those sensor signals.

The extracted signal shown at (b) in FIG. 11 is a signal produced by the position detector 710A based on values at the cross-points between the corrected sensor signals or middle values of those signals, and it is given as one signal resulting from combining the three signals with each other. The position detector 710A executes the signal position calculation based on the extracted signal and obtains the phase signal VO shown at (c) in FIG. 11.

The signal corrector 722A executes signal calculation (e.g., differentiation) on the phase signal VO and obtains the signal information SI3 shown at (d2) in FIG. 11. The signal information SI3 is detected as a signal superimposed with information of the gain error and the offset error contained in the three sensor signals. Also, the signal corrector 722A detects information of the phase error from the signal information SI2. The phase error is given as a difference, indicated by Phas1($n$), Phas2($n$) and Phas3($n$) (where n is the sampling number), relative to the ideal values (±30°) at the timing at which the sensor signals cross each other.

Based on the signal information SI3, a gain error Gain2 and an offset error Off21 can be detected in a first detection zone (about 100°-150°) in the V phase. The detected gain error Gain2 is multiplied by a calculation coefficient for the gain correction to correct the V-phase detected sensor signal at the timing at which the U- and W-phase signals cross each other. In other words, the gain correction is made at the timing near 210° along the horizontal axis. At that timing, the V-phase signal is not used in the position calculation. Accordingly, even if abrupt correction is applied to the V-phase detected sensor signal, the position detecting device 700A can always calculate the position θ in a stable way.

The offset error is also corrected in a similar manner. More specifically, the offset error Off2 is detected as follows:

$$\text{Off2}=k*\{(\text{Off21}-\text{Gain2})-(\text{Off22}-\text{Gain2})\}$$

The detected offset error is multiplied by a calculation coefficient for the offset correction to correct the V-phase detected sensor signal at the timing at which the U- and W-phase signals cross each other. The offset correction is preferably performed using an average value for one cycle (i.e., an average of the values detected in two detection zones per cycle). Stated another way, the offset correction is made at the timing near 380° along the horizontal axis. In the above formula, k is the calculation coefficient and is 0.5, for example.

A W-phase signal phase error Phas32 is detected from the signal information SI2, and the phase correction is also performed at the same timing as the offset correction. The W-phase signal phase error Phas32 is detected as follows:

$$\text{Phas32}=k*\{\text{Phas3}(1)-\text{Phas3}(2)\}$$

The detected phase error is multiplied by a calculation coefficient (generally nearly 1 ($\approx$1)) for the phase correction, to thereby correct the sensor signal through the phase correction calculation of the detected sensor signal. Moreover, the phase error is detected using an average value for one cycle (i.e., an average of the values detected in two detection zones per cycle). Preferably, the phase error is not detected during a period in which the offset correction is performed, and the detection of the phase error and the phase correction is performed after the offset correction result has been converged into a predetermined allowable error range.

Thus, the detected sensor signal can be corrected in a feedback manner such that each sensor error is converged into the predetermined allowable error range. Therefore, the position detection can be stably performed with high accuracy.

Additionally, the gain error, the offset error, and the phase error can also be detected using only the signal information SI2. For example, the gain error of the U-phase signal can be detected as Phas2(1)≈Phas3(1), and the offset error of the V-phase signal can be detected as Phas3(2)≈−Phas1(1). By multiplying the thus-detected error by the correction coefficient, the error can be corrected in a feedback manner. This method is effective in simplifying processing required for the signal calculation.

Further, the gain error and the offset error may be corrected in a feedback manner, while the phase error may be corrected in a feed forward manner as described in the first embodiment.

According to this second embodiment, as described above, since the gain error, the offset error, and the phase error can be corrected on the sensor signals with higher accuracy, the detection accuracy of the pole position can be further increased. It is hence possible to increase the accuracy in detecting the pole position of the motor which is used to perform quick acceleration and deceleration over the range from a zero speed to a high rotation speed.

The construction of a synchronous motor driving device using a position detecting device according to a third embodiment of the present invention will be described below with reference to FIGS. 12-14. Note that the basic construction of the position detecting device according to the third embodiment is the same as that shown in FIG. 10. Also, the basic construction of the synchronous motor driving device using the position detecting device according to the third embodiment is the same as that shown in FIG. 1.

Figure 12:
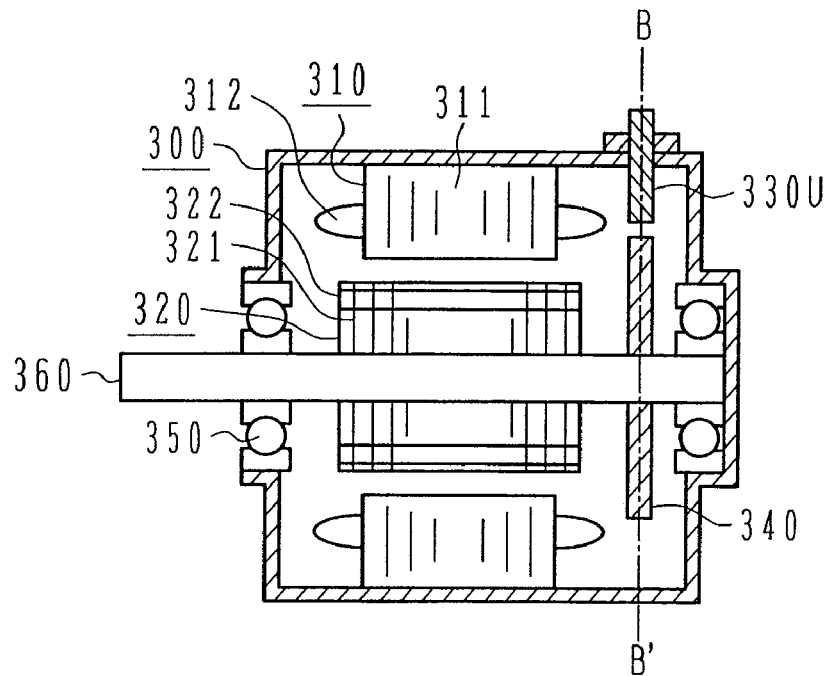
FIG. 12 is a sectional view showing the structure of a synchronous motor and a position sensor for use with the position detecting device according to a third embodiment of the present invention, the view being taken along the axial direction of the motor.

FIG. 12 is a sectional view showing the structure of a synchronous motor and a position sensor for use with the position detecting device according to the third embodiment of the present invention, the view being taken along the axial direction of the motor. FIG. 13 is a sectional view taken along the radial direction of the motor, i.e., taken along the line B-B' in FIG. 12. FIG. 14 shows waveform charts of operation signals for explaining the operation of the position detecting device according to the third embodiment of the present invention.

Figure 14:
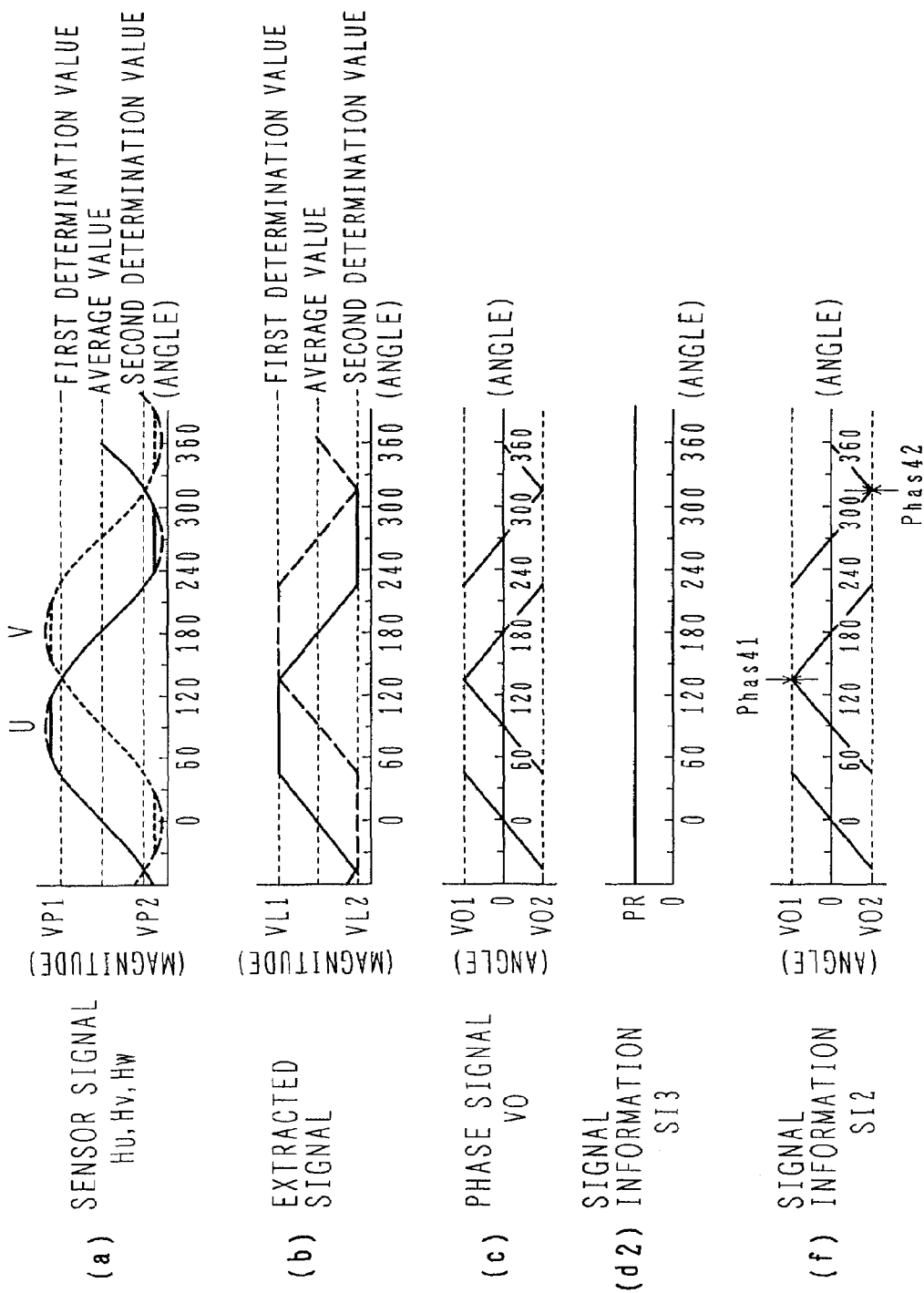
FIG. 14 shows waveform charts of operation signals for explaining the operation of the position detecting device according to the third embodiment of the present invention.

The vertical axes in (a), (b), (c), (d2) and (f) of FIG. 14 represent the same items as those in (a), (b), (c), (d2) and (f) of FIG. 11. The horizontal axis represents an angle, namely an ideal phase (angle), as in FIG. 5.

Figure 13:
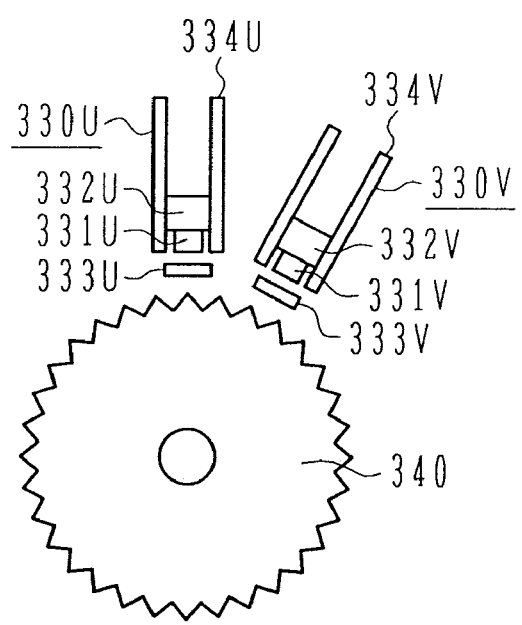
FIG. 13 is a sectional view taken along the line B-B' in FIG. 12.

FIGS. 12 and 13 show the structure of the synchronous motor and the position sensor. FIGS. 12 and 13 differ from FIG. 2 in that a sensor rotor is used in the position sensor unit. The operations of the other components indicated by the same characters are the same as those in FIG. 2. FIG. 14 shows the operation signals and differs from FIG. 2 in using two sensors.

The position sensor unit shown in FIGS. 12 and 13 comprises a sensor rotor 340 made of a magnetic material and sensor units 330U and 330V (suffixes U and V are added to identify two sensor units individually). Gear teeth (in number 32) are formed along an outer circumference of the sensor rotor 340 (in facing relation to the sensor units).

As shown in FIG. 13, the sensor units 330U and 330V are constituted respectively by sensors 331U and 331V, biasing permanent magnets 332U and 332V, and yokes 333U and 333V for forming magnetic paths of the biasing permanent magnets 332U and 332V. Further, the sensor units 330U and 330V are packaged in a resin molding (not shown) for ensuring resistance against environments and convenience in use. The sensor units 330U and 330V are mounted to the motor housing in an easily detachable (or attachable) structure using, e.g., screws (not shown). Preferably, magnetic shields 334U and 334V are disposed to shield magnetic disturbances generated when currents are supplied to the stator windings. The magnetic yokes 333U and 333V are disposed to be able to adjust the amounts of magnetic flux detected by the sensors 331U and 331V.

The two sensors 331U and 331V are arranged at an interval of 90° on an assumption that the pitch of the gear teeth of the sensor rotor 340 corresponds to one cycle (360°). Sensor outputs of the sensors 331U and 331V are each outputted as an analog voltage level in proportion to the amount of magnetic flux passing through a gap between the sensor rotor 340 and the sensor, which is changed with rotation of the sensor rotor 340.

While the number of the gear teeth of the sensor rotor 340 is preferably the integer time the number of the magnet pole pairs, it can be set to an appropriate value depending on the resolution of a rotational angle, manufacturability of the sensor rotor 340, and the output frequency (frequency response) of the sensor. The shape of each gear tooth is preferably selected to be able to provide an analog voltage level corresponding to the rotational angle of the sensor rotor 340. The sensors 331U and 331V are each generally constituted by a Hall device. In the case of employing the biasing magnet, however, a magnetic resistance device can also be used without problems because the amount (magnitude) of the magnet is detected. Further, the rotation sensor can be of any suitable type capable of measuring the change of the gap with the rotation of the sensor rotor 340. Another type of sensor of passing excitation magnetic flux through the sensor rotor and detecting the amount of the excitation magnetic flux, e.g., a resolver, is also applicable. In the latter case, the excitation magnetic flux of high frequency is generally employed. When the amount of the magnetic flux is detected in the form of a voltage output, for example, signal processing using, e.g., a low-pass filter or other processing such as to make the sampling timing in sync with excitation frequency is additionally performed.

From the sensor signals Hu and Hv shown at (a) in FIG. 14, the position detector 710A extracts signals shown at (b) in FIG. 14. The phase signal VO is obtained from the extracted signals. The signal corrector 722A obtains the signal information SI2 and SI3 from the phase signal VO.

In an example shown in FIG. 14, the sensor signals are ideal signals free of the gain error, the offset error, and the phase error. If the sensor signals contain the gain error, the offset error, and the phase error, a Gain2 signal is detected due to the gain error, and Off21 and Off22 signals are detected due to the offset error, as shown at (d2) in FIG. 11. Also, Phas41 and Phas42 signals are detected as zero due to the no phase error as shown at (f) in FIG. 14. Based on those error signals, the signal corrector 722A can detect the respective errors by the methods described above with reference to FIG. 11.

When two sensor signals are used like this embodiment, the timing of detecting the signal information SI2 is set to a point in time at which the sensor signal level matches with each of the first and second determination values (VL1, VL2). When cross points between the sensor signals can be utilized, the timing of each cross point is also used in a combined manner. As an alternative, absolute values of the extracted signals may be taken to perform the detection at the cross points without problems. Further, smaller one of the absolute values may be extracted. Thus, even in the case of employing the two sensor signals, it is possible to correct the gain error, the offset error, and the phase error, and to perform the position detection at a lower cost with high accuracy.

While the above embodiments have been described as employing two or three sensors, the detection accuracy or reliability can be increased by detecting two or more sensor signals. For example, if one of the three sensors mounted at intervals of 120° is failed, failure diagnosis can be made based on the magnitude of an error contained in the sensor signal. Stated another way, if the two sensors are normally operated, this is regarded as being equivalent to the arrangement that they are mounted with the phase error shifted at 30° in comparison with the case where only the two sensors are mounted from the beginning. Thus, by correcting the phase error of 30° in accordance with the error detection and the error correction of the present invention, the position detected value θs can be obtained in the range of 0-360°. Meanwhile, when a maximum error correction amount is set to 20° in the stage of design, the driving of the motor can be continued within the range of a position detection error being 10° at maximum by setting the error diagnosis so as to allow a phase error of remaining 10° that exceeds a limit of the correction. As a result, reliability can be greatly increased.

When the sensor signals contain the gain error, the offset error, and the position error as discussed above in the embodiments, the position error is superimposed in the range of about ±30° with the reference phase value being a base from the principle of the position detection. In other words, whenever the reference phase value is updated for each cycle of 60°, a large position detection error appears. Eventually, the output voltage of the inverter causes a voltage phase shift (pulsation) at a cycle of 60° and the motor current varies (namely, the current phase abruptly changes). Particularly, if the error is superimposed on the waveform of the sensor signal during the driving of the motor, the motor current may vary, thus causing noisy sounds. By performing the error detection and the error correction according to the present invention, since the error of the sensor signal can be corrected within about several cycles (theoretically within one cycle at minimum), the motor voltage or the motor current varies just temporarily after superimposition of the error and can be quickly stabilized.

Even when the method of detecting the position from two signals having a phase difference of 90° between them by using arc tangent is employed instead of the above-described position calculation method using the reference phase value, the error of the sensor signal can be detected and corrected by the position correction method according to the present invention.

While the above embodiments have been described as using the Hall device, the sensor may be of any suitable type capable of outputting an analog signal without problems. For example, the sensor may be an MR device or a resolver. In the case of requiring the signal detection in sync with excitation frequency as in a resolver, the driving of the motor can be realized with high accuracy and high efficiency by sampling the sensor signal in sync with the excitation frequency and performing the correction method according to the present invention.

Further, when the motor driving is to be continued even in the case of a sensor failure, reliability can be improved by correcting the position detected value through the known calculation for estimating the pole position while using the applied voltage (which may be replaced with a command value), the motor current, and motor parameters (such as winding resistance, winding inductance, and an induced voltage coefficient).

According to this third embodiment, as described above, since the gain error, the offset error, and the phase error can be corrected, the detection accuracy of the pole position can be increased. It is hence possible to increase the accuracy in detecting the pole position of the motor which is used to perform quick acceleration and deceleration over the range from a zero speed to a high rotation speed.

In addition, the temperature and the amount of the magnetic flux can also be detected using the amounts in changes of the gain error and the offset error. For example, the amount of change in the offset error can be determined as a temperature change and utilized for detecting the temperature. Also, the difference obtained by subtracting the gain error from a value corresponding to the temperature change can be determined as a change in the amount of the magnetic flux and utilized for detecting the amount of the magnetic flux. Therefore, temperature monitoring can be performed together with the motor driving while the motor output torque is corrected. Moreover, since the amount of change in the phase error can be used to detect the amount of torsion (torque) of a shaft, e.g., the sensor rotor, the motor driving can also be performed while the motor output torque is measured.

The construction of a synchronous motor driving device using a position detecting device according to a fourth embodiment of the present invention will be described below with reference to FIG. 15.

Figure 15:
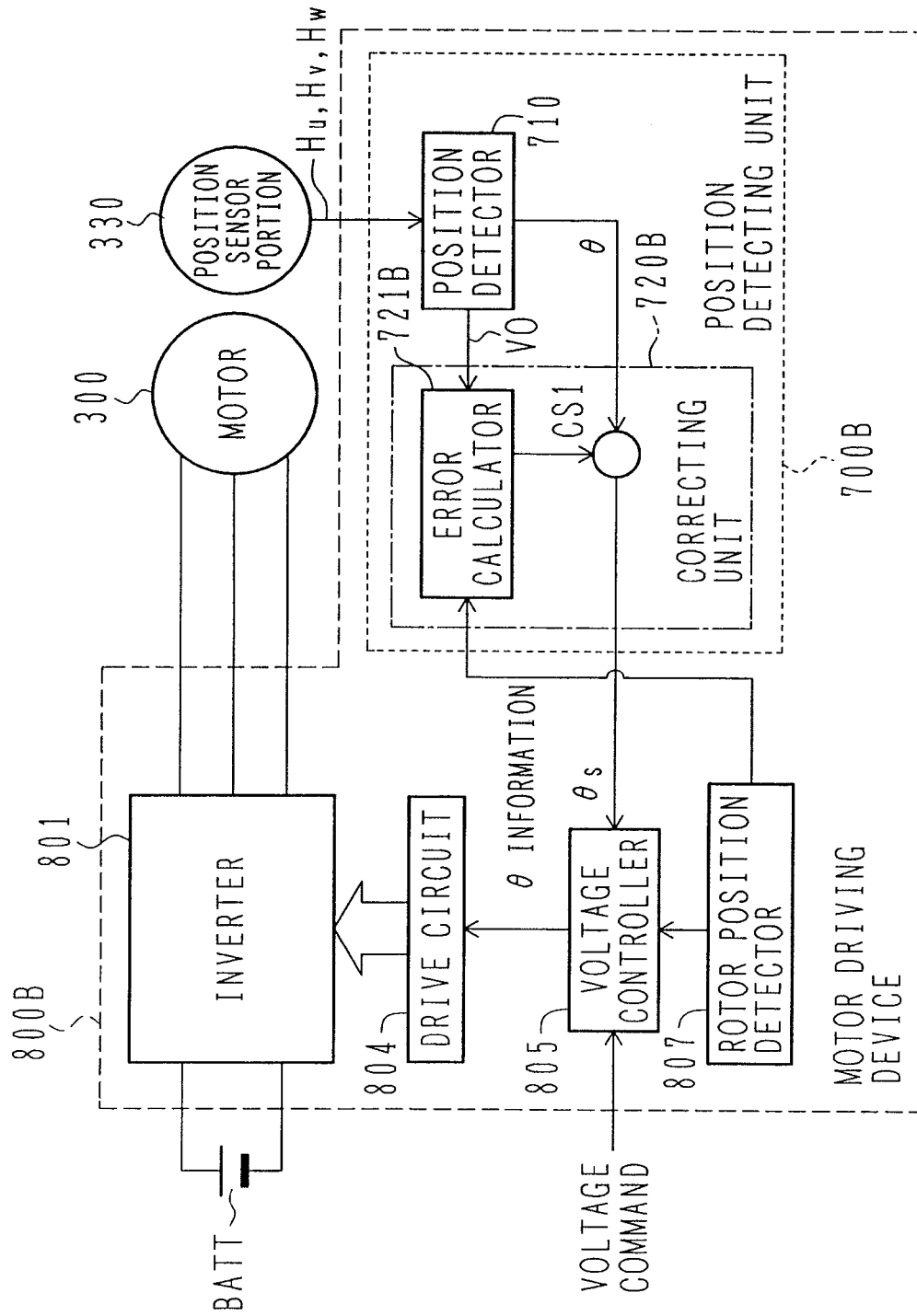
FIG. 15 is a block diagram of a synchronous motor driving device using a position detecting device according to a fourth embodiment of the present invention.

FIG. 15 is a block diagram of the synchronous motor driving device using the position detecting device according to the fourth embodiment of the present invention. Note that, in FIG. 15, the same characters as those in FIG. 1 denote the same components.

A motor driving device 800B includes a rotor position settling unit 807 in addition to the construction of the motor driving device 800 shown in FIG. 1. The rotor position settling unit 807 outputs a command to the voltage controller 805 so that the permanent-magnet synchronous motor 300 is driven through a predetermined electrical angle in a stepping manner under PWM control and the rotor stop position of the motor 300 is settled. Also, the rotor position settling unit 807 outputs angle information, which represents the settled rotor stop position, to an error calculator 721B.

The error calculator 721B of a correcting unit 720B in a position detecting device 700B calculates a position detection error based on the difference between the position detected value inputted from the position detector 710 and the angle information inputted from the rotor position settling unit 807. The rotor position detection error is calculated by solving the simultaneous equations given as the above-mentioned formulae (1), (2) and (3). The correcting unit 720B corrects the rotor position detection error based on the correction amount CSI obtained by the error calculator 721B.

According to this fourth embodiment, as described above, since the gain error, the offset error, and the phase error can be corrected, the detection accuracy of the pole position can be increased. It is hence possible to increase the accuracy in detecting the pole position of the motor which is used to perform quick acceleration and deceleration over the range from a zero speed to a high rotation speed.

The construction of a hybrid vehicle system to which is applied the motor driving device shown as any of the embodiments of the present invention will be described below with reference to FIG. 16.

Figure 16:
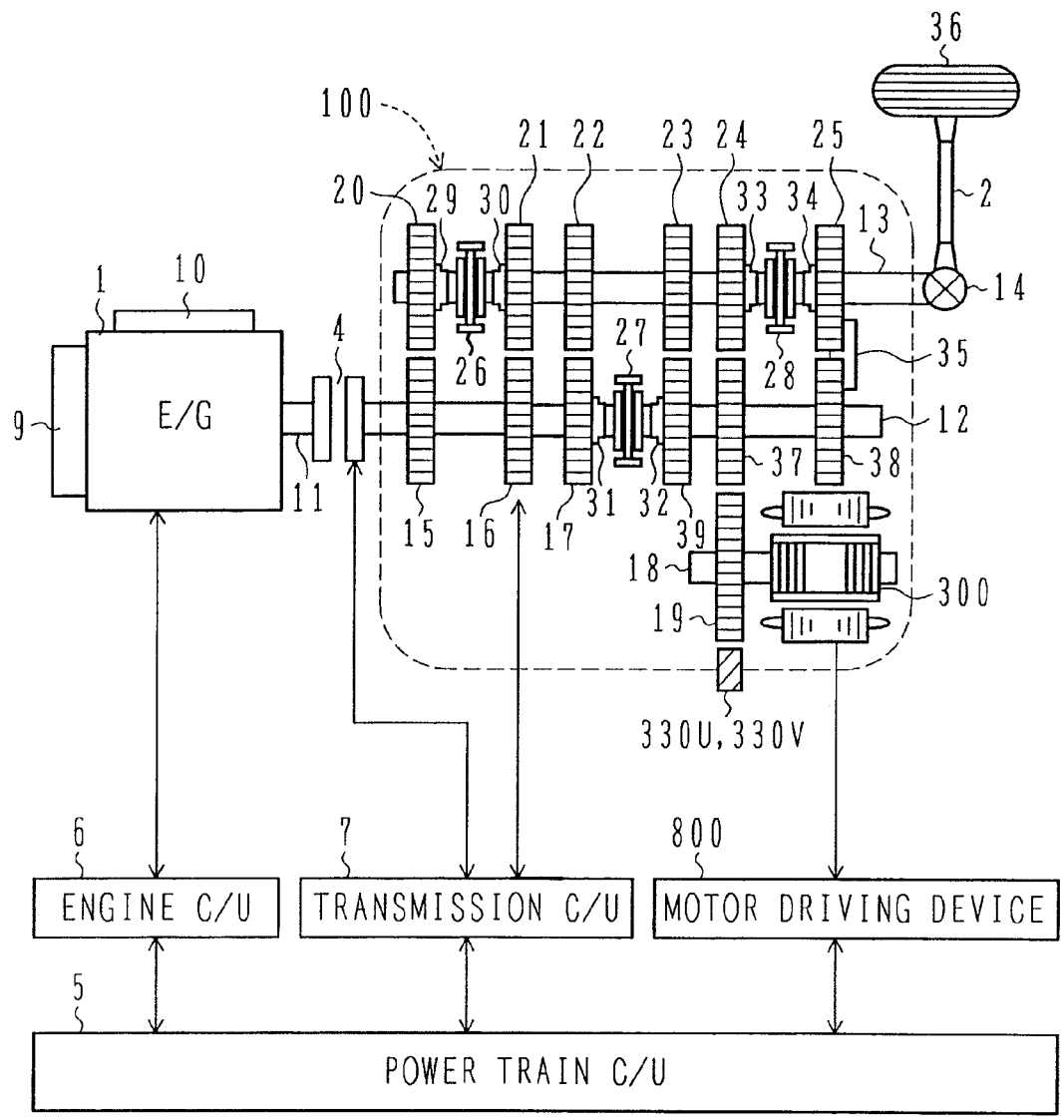
FIG. 16 is a schematic view showing the construction of a hybrid vehicle to which is applied the motor driving device shown as any of the embodiments of the present invention.

FIG. 16 is a schematic view showing the construction of the hybrid vehicle system to which is applied the motor driving device shown as any of the embodiments of the present invention.

The operation of an engine 1 is started by a starter 9. In the engine 1, an amount of intake air is controlled by an electronic control throttle 10 disposed in an intake pipe (not shown), and fuel is injected from a fuel injector (not shown) in amount corresponding to the amount of intake air. Also, the ignition timing is decided in accordance with signals indicating an air/fuel ratio decided from the amount of intake air and the amount of fuel, an engine revolution speed, etc., and an air-fuel mixture is ignited by an ignition device (not shown).

A gear 17 provided with a meshing gear 31, a gear 39 provided with a meshing gear 32, a hub sleeve 27, and gears 15, 16, 37 and 38 are fitted over an input shaft 12 of a transmission mechanism 100. The gears 15, 16, 37 and 38 are fixedly fitted over the input shaft 12, and the gears 17 and 39 are fitted in a structure not allowing those gears to move in the axial direction of the input shaft 12. The hub sleeve 27 is coupled to the input shaft 12 through a meshing mechanism (not shown) which allows the hub sleeve to move in the axial direction of the input shaft 12, but restricts it in the rotating direction thereof.

A gear 20 provided with a meshing gear 29, a gear 21 provided with a meshing gear 30, a hub sleeve 26, a gear 24 provided with a meshing gear 33, a gear 25 provided with a meshing gear 34, a hub sleeve 28, and gears 22 and 23 are fitted over an output shaft 13 of the transmission mechanism 100. The gears 22 and 23 are fixedly fitted over the output shaft 13, and the gears 20, 21, 24 and 25 are fitted in a structure not allowing those gears to move in the axial direction of the output shaft 13. The hub sleeves 26 and 28 are coupled to the output shaft 13 through a meshing mechanism (not shown) which allows the hub sleeves to move in the axial direction of the output shaft 13, but restricts them in the rotating direction thereof.

The gears 15 and 20, the gears 16 and 21, the gears 17 and 22, the gears 39 and 23, and the gears 37 and 24 are meshed with each other to constitute gear combinations having different gear ratios when torque is transmitted from the input shaft 12 to the output shaft 13. Further, the gear 25 can be coupled to the gear 38 through a reverse gear 35 and serves to selectively reverse the relationship in rotating direction between the input shaft 12 and the output shaft 13.

A gear train made up of the gears 15 and 20 corresponds to a first speed, a gear train made up of the gears 16 and 21 corresponds to a second speed, and a gear train made up of the gears 17 and 22 corresponds to a third speed. A gear train made up of the gears 39 and 23 corresponds to a fourth speed, a gear train made up of the gears 37 and 24 corresponds to a fifth speed, and a gear train made up of the gears 25, 35 and 38 corresponds to reverse.

When the torque of the input shaft 12 is transmitted to both the gears 17 and 39, the meshing gears 31 and 32 are directly coupled to the hub sleeve 27 through meshing grooves (not shown).

A clutch mechanism constituted by the hub sleeve 27, the meshing gear 31, and the meshing gear 32 is called a meshing (dog) clutch which can transmit the torque of the input shaft 12 to the output shaft 13 with high efficiency, thus resulting in reduced fuel consumption.

Further, the hub sleeve 26, the meshing gear 29, and the meshing gear 30 constitute a dog clutch, while the hub sleeve 28, the meshing gear 33, and the meshing gear 34 constitute a dog clutch. These dog clutches operate similarly to the above-mentioned dog clutch so that the torque is transmitted to the output shaft 13 through the gears 20 and 21 and the gears 24 and 25, respectively.

A clutch 4 is interposed between a crankshaft 11 of the engine 1 and the input shaft 12. When the clutch 4 is engaged, motive power can be transmitted from the engine 1 to the input shaft 12. When the clutch 4 is disengaged, the transmission of motive power from the engine 1 to the input shaft 12 can be cut off. Generally, the clutch 4 is constituted by a dry and single-plate friction clutch, and the torque transmitted from the engine 1 to the input shaft 12 can be adjusted by controlling a pressing force applied to the clutch 4. As an alternative, the clutch 4 may be constituted by a wet and multi-plate friction clutch or an electromagnetic clutch so long as it is capable of adjusting the transmitted torque. Stated another way, the clutch 4 is also used in an ordinary gasoline engine vehicle, and the vehicle can be started by gradually pressing the clutch 4.

A final gear 14 is fitted over the output shaft 13 of the transmission mechanism 100, and the final gear 14 is coupled to a tire 36 through a vehicle driving shaft 2.

A gear 19 is fixed to a motor output shaft 18, and the gear 19 is meshed with the gear 37. Torque of a motor 300 can be thus transmitted to the input shaft 12.

The engine 1 and the motor 300 are controlled by an engine C/U (control unit; this is equally applied to the following description) 6 and a motor driving device 800, respectively. The clutch 4 and the transmission mechanism 100 are controlled by a transmission C/U 7. A power train C/U 5 receives not only various signals from an accelerator-pedal opening sensor, a vehicle speed sensor, etc. (not shown), but also operating states (such as the rotation speed, the torque, and the gear ratio) of the engine 1, the motor 300, the clutch 4, and the transmission mechanism 100. Based on those input signals and states, the power train C/U 5 controls the engine C/U 6, the motor driving device 800, and the transmission C/U 7 in a supervising manner.

At startup of the vehicle with a driving force of the motor 300, the vehicle can be smoothly started by meshing the hub sleeve 26 with the meshing gear 29, disengaging the clutch 4, and generating the torque of the motor 300 in the positive side (forward direction). Thereafter, the clutch 4 is engaged for switchover to a driving force of the engine such that the vehicle continues to travel by the engine driving force. Thus, since the motor driving is utilized in a low load range (e.g., at the startup) where engine efficiency is poor, fuel economy can be improved.

Further, sensor units 330U and 330V are mounted to a transmission case in such a manner that they can be replaced from the outside of the transmission case. Therefore, even when sensors are replaced in the manufacturing stage of a product or by a dealer, errors of the sensors themselves and mounting errors can be corrected on the running basis in the manner described above, and workability can be increased to a large extent.

The construction of an electric power steering system to which is applied the motor driving device shown as any of the embodiments of the present invention will be described below with reference to FIG. 17.

Figure 17:
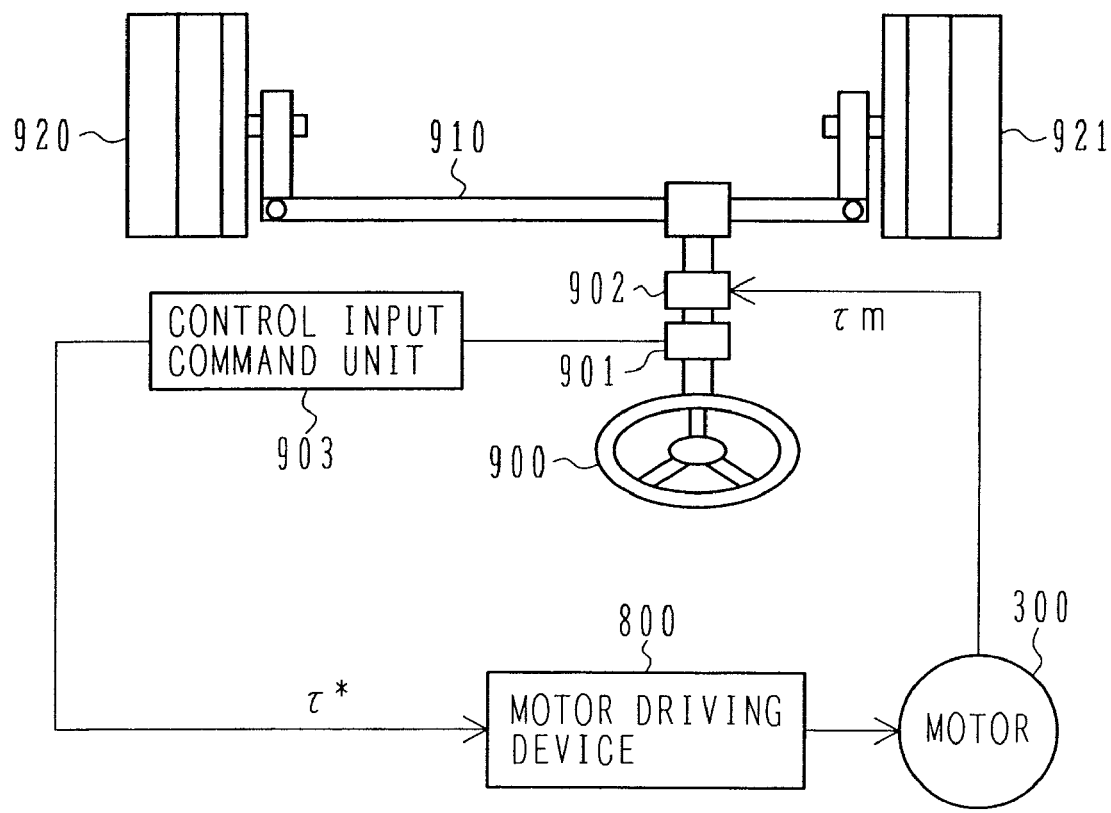
FIG. 17 is a schematic view showing the construction of an electric power steering system to which is applied the motor driving device shown as any of the embodiments of the present invention.

FIG. 17 is a schematic view showing the construction of the electric power steering system to which is applied the motor driving device shown as any of the embodiments of the present invention.

An electric actuator comprises a torque transmission mechanism 902, the motor 300, and the motor driving device 800. The electric power steering system mainly comprises the electric actuator, a steering wheel 900, a steering detector 901, and a control input command unit 903. When an operating force is applied from a driver to the steering wheel, the electric power steering system assists the steering torque with the aid of the electric actuator.

A torque command τ* for the electric actuator is issued, as a steering assist torque command (produced by the control input command unit 903), with the steering operation in order to reduce the steering force to be applied from the driver by utilizing an output of the electric actuator. The motor driving device 800 receives, as an input command, the torque command τ* and controls a motor current based on the torque constant of the driving motor and the torque command τ* so as to follow a torque command value.

A motor output τm outputted from the output shaft 360 (see FIG. 2) directly coupled to the rotor of the motor 300 transmits torque to a rack 910 of the electric power steering system through a speed reducing mechanism such as a worm, a wheel and a planetary gear, or the torque transmission mechanism 902 using a hydraulic mechanism, thereby steering wheels 920 and 921 while relieving (assisting) the steering force (operating force) applied from the driver to the steering wheel 900 with the aid of an electrical power force. An amount of the assisted electrical power force is decided as the torque command τ* by the control input command input 903 through the steps of detecting operation variables, such as a steering angle and steering torque, by the steering detector 901 which is built in a steering shaft and detects the steering state, and taking into account status variables, such as the vehicle speed and the road surface state.

Since the motor driving device of the present invention is able to correct a phase difference caused in the rotation sensor and to drive the motor with high efficiency even in response to the torque command τ* required for the electric actuator which is subjected to quick acceleration and deceleration, the motor can be driven without reducing motor efficiency even in a field weakening range where the electric actuator is operated at high speed and high torque. Further, at low speed, it is also possible to reduce the sensor mounting error and to stably drive the motor with a small torque variation. Accordingly, the electric power steering system employing the motor driving device of the present invention can realize a high-torque and a fast-response electric power steering system without impairing a satisfactory feel of the driver in the steering operation.

What is claimed is:

1. A position detecting device for detecting a motor pole position by using at least two sensor signals, comprising:
  a position detector for executing position calculation by inputting basic-wave component signals in said sensor signals,
  a correcting means for correcting so as that a position detecting error is reduced,
  wherein said position detector extracts said sensor signals in a range between predetermined first and second determination values, thereby converting extracting signals, and said first determination value is larger than said second determination value and is smaller than a maximum value of said sensor signals, and said second determination value is larger than a minimum value of said sensor signals; and
  means for correcting to reduce a position detecting error by calculating signal information representing at least one of a gain, an offset and a phase by using a signal between said first determination value and said second determination value in said extracting signal and making a correction based on the signal information.

2. The position detecting device according to claim 1, wherein said sensor signals are three-phase signals of U-, V- and W-phases, and said signal between said first determination value and said second determination value in said extracting signal is a signal from a cross point between the U-phase signal and the W-phase signal to a cross point between the V-phase signal and the W-phase, a signal from a cross point between the V-phase signal and the W-phase signal to a cross point between the U-phase signal and the V-phase, a signal from a cross point between the U-phase signal and the W-phase signal to a cross point between the V-phase signal and the W-phase, and a signal from a cross point between the U-phase signal and the V-phase signal to a cross point between the U-phase signal and the W-phase.

3. A motor driving device comprising:
  a semiconductor device for converting DC power to AC power or converting AC power to DC power;
  a position detecting device for detecting a motor pole position by using two or more sensor signals;
  a position detector calculator configured to execute position calculation by inputting basic-wave component signals in said sensor signals,
  wherein said position detector calculator is configured to extract said sensor signals in a range between predetermined first and second determination values, thereby converting extracting signals, and said first determination value is larger than said second determination value, and is smaller than a maximum value of said sensor signal, and said second determination value is larger than a minimum value of said sensor signal; and
  said means for correcting so as to reduce position detection error by calculating signal information representing at least one of gain, an offset and a phase by using a signal between said first determination value and said second determination value in said extracting signal and making correction based on the signal information.

4. The position detecting device according to claim 3, wherein said sensor signals are three-phase signals of U-, V- and W-phases, and said signal between said first determination value and said second determination value in said extracting signal is a signal from a cross point between the U-phase signal and the W-phase signal to a cross point between the V-phase signal and the W-phase, a signal from a cross point between the V-phase signal and the W-phase signal to a cross point between the U-phase signal and the V-phase, a signal from a cross point between the U-phase signal and the W-phase signal to a cross point between the V-phase signal and the W-phase, and a signal from a cross point between the U-phase signal and the V-phase signal to a cross point between the U-phase signal and the W-phase.

5. A motor driving system comprising:
  a semiconductor device for converting from DC power to AC power or converting from AC power to DC power;
  a position detecting device for detecting a motor pole position by using two or more sensor signals;
  a sensor unit for generating said sensor signal;
  a position detector for executing position calculation by inputting basic-wave component signals in said sensor signals,
  wherein said position detector extracts said sensor signals in a range between predetermined first and second determination values, thereby converting extracting signals, and said first determination value is larger than said second determination value, and is smaller than a maximum value of said sensor signal, and said second determination value is larger than a minimum value of said sensor signal; and means for correcting to reduce position detecting error by calculating signal information representing at least one of a gain, an offset and a phase by using a signal between said first determination value and said second determination value in said extracting signal and making correction based on the signal information.

6. The position detecting system according to claim 5, wherein said sensor unit consists of Hall element at least.

7. The motor driving system according to claim 5, further comprising a sensor unit for generating said sensor signal, wherein said sensor unit includes a magnetic adjusting member for adjusting an amount of effective magnetic flux crossing a sensor.

8. The position detecting system according to claim 7, wherein said sensor unit consists of Hall element at least.

9. The position detecting system according to claim 5, further comprising a sensor unit for generating said sensor signal, said sensor unit having a magnetic shielding member oriented perpendicularly to a direction in which magnetic flux is sensed.

10. The position detecting system according to claim 9, wherein said sensor unit consists of Hall element at least.

11. The position detecting system according to claim 5, wherein said sensor unit includes a plurality of sensors attachable to a motor housing from the outside.

12. The position detecting system according to claim 11, wherein said sensor unit consists of Hall element at least.

13. A permanent-magnet synchronous motor driving device comprising:

a position detecting device for detecting a motor pole position by using two or more sensor signals;

a motor controller for producing a PWM drive signal based on a position detected value detected by said position detecting device, and outputting the PWM drive signal to an inverter, thereby driving a permanent-magnet synchronous motor;

a sensor unit for generating said sensor signal;

a position detector for executing position calculation by inputting basic-wave component signals in said sensor signals, wherein said position detector extracts said sensor signals in a range between predetermined first and second determination values, thereby converting extracting signals and said first determination value is larger than said second determination value, and is smaller than a maximum value of said sensor signal, and said second determination value is larger than a minimum value of said sensor signal; and means for correcting to reduce position detection error by calculating signal information representing at least one of a gain, an offset and a phase by using a signal between said first determination value and said second determination value in said extracting signal and making correction based on the signal information.

14. The position detecting device according to claim 13, wherein said sensor signals are three-phase signals of U-, V- and W-phases, and said signal between said first determination value and said second determination value in said extracting signal is a signal from a cross point between the U-phase signal and the W-phase signal to a cross point between the V-phase signal and the W-phase, a signal from a cross point between the V-phase signal and the W-phase signal to a cross point between the U-phase signal and the V-phase, a signal from a cross point between the U-phase signal and the W-phase signal to a cross point between the V-phase signal and the W-phase, and a signal from a cross point between the U-phase signal and the V-phase signal to a cross point between the U-phase signal and the W-phase.

* * * * *